US011577484B2

(12) United States Patent
Watts et al.

(10) Patent No.: US 11,577,484 B2
(45) Date of Patent: Feb. 14, 2023

(54) INFLATION AND SEALING DEVICE WITH WEB CONTROL

(71) Applicant: Pregis Innovative Packaging LLC, Deerfield, IL (US)

(72) Inventors: William James Watts, Oak Lawn, IL (US); Julian Michael Moore, Elgin, IL (US); Charles Anthony Daigle, El Dorado Hills, CA (US); Joseph Vincent Prisco, Geneva, IL (US)

(73) Assignee: Pregis Innovative Packaging LLC, Chicago, IL (US)

( * ) Notice: Subject to any disclaimer, the term of this patent is extended or adjusted under 35 U.S.C. 154(b) by 52 days.

(21) Appl. No.: 17/131,650

(22) Filed: Dec. 22, 2020

(65) Prior Publication Data
US 2021/0187893 A1 Jun. 24, 2021

Related U.S. Application Data

(60) Provisional application No. 62/952,710, filed on Dec. 23, 2019.

(51) Int. Cl.
*B31D 5/00* (2017.01)
*B29C 65/18* (2006.01)
*B29C 65/00* (2006.01)
*B29L 22/02* (2006.01)

(52) U.S. Cl.
CPC ............ *B31D 5/0073* (2013.01); *B29C 65/18* (2013.01); *B29C 66/439* (2013.01); *B29L 2022/02* (2013.01); *B31D 2205/0047* (2013.01); *B31D 2205/0088* (2013.01)

(58) Field of Classification Search
CPC .......... B31D 5/0073; B31D 2205/0047; B31D 2205/0088; B29L 2022/02; B29C 66/439; B29C 65/18
See application file for complete search history.

(56) References Cited

U.S. PATENT DOCUMENTS

| 8,402,719 B2 | 3/2013 | Birkle et al. |
| 9,168,715 B2 | 10/2015 | Wetsch et al. |
| 9,381,715 B2 * | 7/2016 | Birkle ............... B29C 66/91212 |

(Continued)

FOREIGN PATENT DOCUMENTS

WO WO-0226589 A1 * 4/2002 ............. B29C 65/18

OTHER PUBLICATIONS

International Search Report and Written Opinion for International Application No. PCT/US20/66738, filed Dec. 22, 2020, dated May 21, 2021.

*Primary Examiner* — Thomas M Wittenschlaeger
(74) *Attorney, Agent, or Firm* — Fox Rothschild LLP

(57) ABSTRACT

The present disclosure is directed to a web control guide for an inflation and sealing assembly of a protective packaging formation device for inflating a web material into a chain of inflated cushions. The web control guide is positioned along a material path at a transverse spacing from a first compression element and constrains a first thickness of the material path measured normal to the longitudinal and transverse directions of the material path. The transverse spacing and constrained thickness dimension are sufficiently small to prevent transverse movement of the flexible material towards the first compression element to avoid excessive heating of the web material outside a sealing zone.

22 Claims, 14 Drawing Sheets

(56) References Cited

U.S. PATENT DOCUMENTS

| | | |
|---|---|---|
| 10,293,569 B2 | 5/2019 | Wetsch et al. |
| 2008/0066852 A1 | 3/2008 | Wetsch et al. |
| 2015/0239592 A1* | 8/2015 | Wetsch .............. B29C 49/0042 53/79 |
| 2017/0027503 A1 | 9/2017 | Wetsch et al. |
| 2018/0297729 A1 | 10/2018 | Liao et al. |

* cited by examiner

INFLATION AND SEALING DEVICE WITH WEB CONTROL

TECHNICAL FIELD

The present disclosure relates to packaging materials. More particularly, the present disclosure is directed to devices and methods for manufacturing inflatable cushions to be used as packaging material.

BACKGROUND

A variety of inflated cushions are well known and used for sundry packaging applications. For example, inflated cushions are often used as protective packaging in a manner similar to or in place of foam peanuts, crumpled paper, and similar products. Also for example, inflated cushions are often used as protective packaging in place of molded or extruded packaging components. A typical type of inflated cushions is formed from films having two plies that are joined together by seals. The seals can be formed simultaneously with inflation, so as to capture air therein, or prior to inflation to define a film configuration having inflatable chambers. The inflatable chambers can be inflated with air or another gas and thereafter sealed to inhibit or prevent release of the air or gas.

SUMMARY

Embodiments of the present disclosure may include a protective packaging formation device. A protective packaging formation device is disclosed. The device includes a drive that advances a web of a flexible material along a material path that extends in a longitudinal direction. An inflation nozzle directs fluid between overlapping plies of the flexible web in the material path for inflating inflatable chambers defined between the plies with the fluid. The device includes a heat sealer with first and second opposed compression elements in compression against each other to compress the overlapping plies together at the sealing zone along the material path. A heating element is configured to provide heat to the sealing zone. The compression elements and heating element are arranged and configured to cooperatively produce sufficient compression and heat in the compressed overlapping plies in the sealing zone to heat seal the overlapping plies together, thereby sealing closed the inflated inflatable chambers and trapping the fluid therein. A web control guide is positioned along the material path at a transverse spacing from the first compression element and constrains a first thickness of the material path measured normal to the longitudinal and transverse directions of the material path. The constrained thickness dimension is sufficiently small to prevent transverse movement of the flexible material towards the first compression element to avoid excessive heating of the web outside the sealing zone.

In some embodiments, the inflation assembly includes a web material director that includes a web director portion that contacts a first surface of the web material, and a second web director portion opposed to the first portion that contacts a second surface of the web material. The inflation nozzle is disposed between the web material director portions and operable to be received within an inflation channel formed between the plies and to flow a fluid therefrom into the inflation channel to inflate the chambers. The web material director portions contact the web material upstream of the sealing region along the material path, and extend in a transverse direction of the web material sufficiently to engage an inflated portion of a chamber to keep a transverse axis of the web material aligned with an axis of the sealing element and an axis of opposed compression elements that seal the overlapping plies together.

DETAILED DESCRIPTION

The present disclosure is related to protective packaging and systems and methods for converting inflatable material into inflated cushions that may be used as cushioning or protection for packaging and shipping goods.

Figure 1:
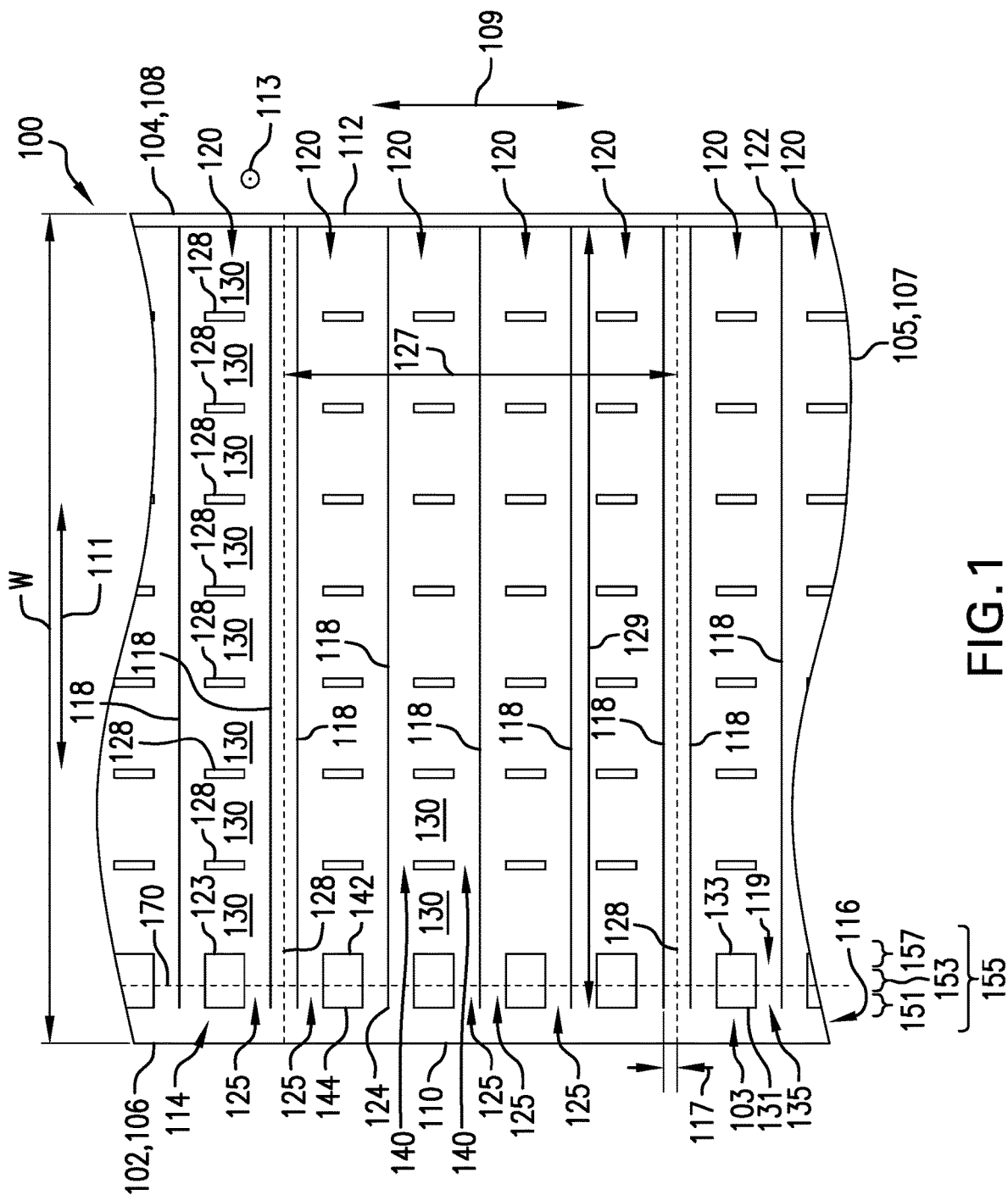
FIG. 1 is a top view of an uninflated web material.

As shown in FIG. 1, a multi-ply flexible web material 100 for inflatable cushions 121 is provided. The web material extends in a longitudinal direction 109, and a transverse direction 111. The longitudinal direction 109 generally corresponds to a direction the web material 100 is fed on a path 115 through a forming or inflating apparatus, or a direction that the web material 100 travels as it is removed from, or added to a bulk supply of material, such as a stack or roll. The transverse direction 111 is generally orthogonal to the longitudinal direction 109, extending in a direction along a width W of the web material 100. The web material 100 includes a first film ply 105 having a first longitudinal edge 102 and a second longitudinal edge 104, and a second film ply 107 having a first longitudinal edge 106 and a second longitudinal edge 108. The second film ply 107 is aligned to be overlapping and can be generally coextensive with the first film ply 105, i.e., at least respective first longitudinal edges 102, 106 are aligned with each other and/or second longitudinal edges 104, 108 are aligned with each other. In some embodiments, the plies can be partially overlapping with inflatable areas in the region of overlap. The web material 100 thus extends in a thickness direction 113, shown in FIG. 1 as extending out of the page, along the thickness of the plies. The thickness direction 113 is generally orthogonal to both the longitudinal direction 109 and the transverse direction 111.

FIG. 1 illustrates a top view of the web material 100 having first and second plies 105, 107 joined to define a first longitudinal edge 110 and a second longitudinal edge 112 of the web material 100. The first and second plies 105, 107 can be formed from a single sheet of flexible material, a flattened tube of flexible material with one edge having a slit or being open, or two sheets of flexible material which can be sealed along the longitudinal edges 104, 108 to define the longitudinal edge 112 of the flexible structure 100. For example, the first and second plies 105, 107 can include a single sheet of flexible material that is folded to define the joined second longitudinal edges 104, 108 (e.g., "c-fold film"). In a more particular example, edges 104, 108 are at the c-fold in such an embodiment. Alternatively, for example, the first and second plies 105, 107 can include a tube of flexible material (e.g., a flatten tube) that is slit along the aligned first longitudinal edges 102, 106. Also, for example, the first and second plies 105, 107 can include two independent sheets of flexible material joined, sealed, or otherwise attached together along the aligned second longitudinal edges 104, 108.

In some embodiments, the web plies 105,107 are between about 0.5 and 4 mils thick. In some embodiments, the web plies 105,107 are at least about 1 mil thick. In some embodiments, the web plies 105,107 may be between about 2 and 3 microns thick.

In some embodiments, the web plies 105,107 are made from a co-extruded material that contains nylon. For example, the web plies 105,107 may be made from polyethylene and nylon. Materials containing nylon serve as an fluid barrier and retain the air or other desired fluid over the shipping and storage cycle of shoes. Other suitable materials and constructions can be used.

A multi-ply web 100 may be made of a monolayer or multilayer polymeric film material. Each ply may be made from a monolayer or multilayer film. Monolayer films are typically made of polyethylene, although other suitable polymers may be used. The one or more layers of multilayer film embodiments may include polymers of differing compositions. In some embodiments, the disclosed layers may be selected from ethylene, amide, or vinyl polymers, copolymers, and combinations thereof. The disclosed polymers can be polar or non-polar. The disclosed ethylene polymers may be substantially non-polar forms of polyethylene. In many cases the ethylene polymer may be a polyolefin made from copolymerization of ethylene and another olefin monomer, for example an alpha-olefin. The ethylene polymer may be selected from low, medium, or high density polyethylene, or a combination thereof. In some cases, the density of various polyethylenes may vary, but in many cases the density of low density polyethylene may be, for example, from about 0.905 or lower to about 0.930 g/cm3, the density of medium density polyethylene may be, for example, from about 0.930 to about 0.940 g/cm3, and high density polyethylene may be, for example, from about 0.940 to about 0.965 g/cm3 or greater. Other suitable densities of various polyethylenes may be used. The ethylene polymer may be selected from linear density polyethylene (LDPE), linear low density polyethylene (LLDPE), medium density polyethylene (MDPE), and high density polyethylene (HDPE), and blends thereof; and metallocenes such as metallocene LLDPE (mLLDPE), or metallocene MDPE (mMDPE). Other suitable materials and constructions can be used such as a heat sealable and inflatable material. For instance, composites of materials can be used. The disclosed web material 100 can be rolled on a hollow tube, a solid core, or folded in a fan folded box, or in another desired form for storage and shipment. Other suitable web materials can alternatively be used, which preferably include a seal layer to heat seal to another similar layer.

In some embodiments, the polar polymer may be a non-polar polyethylene which may be modified to impart a polar characteristic. In other embodiments the polar polymer is an ionomer (e.g., copolymers of ethylene and meth acrylic acid, E/MAA), a high vinyl acetate content EVA copolymer, or other polymer with polar characteristics. In one embodiment the modified polyethylene may be anhydride modified polyethylene. In some embodiments, the maleic anhydride is grafted onto the olefin polymer or copolymer. Modified polyethylene polymers may react rapidly upon coextruding with polyamide and other ethylene containing polymers (e.g., EVOH). In some cases a layer or sublayer comprising the modified polyethylene may form covalent bonds, hydrogen bonds and/or, dipole-dipole interactions with other layers or sublayers, for example sublayers or layers comprising a barrier layer. In many embodiments, modification of a polyethylene polymer may increase the number of atoms on the polyethylene that are available for bonding. For example, modification of polyethylene with maleic anhydride adds acetyl groups to the polyethylene, which may then bond with polar groups of the barrier layer, for example hydrogen atoms on a nylon backbone. Modified polyethylene may also form bonds with other groups on the nylon backbone as well as polar groups of other barrier layers, for example alcohol groups on EVOH. In some embodiments, a modified polyethylene may form chain entanglements and/or van der Waals interactions with an unmodified polyethylene.

The layers of the plies 105,107 may be adhered or otherwise attached together, for example, by tie layers. In other embodiments, one or more of the plies 105,107 are a single layer of material, for example, a polyethylene layer.

Mixtures of ethylene and other molecules may also be used. For example, ethylene vinyl alcohol (EVOH) is a copolymer of ethylene and vinyl alcohol. EVOH has a polar character and can aid in creating a gas barrier. EVOH may be prepared by polymerization of ethylene and vinyl acetate to give the ethylene vinyl acetate (EVA) copolymer followed by hydrolysis. EVOH can be obtained by saponification of an ethylene-vinyl acetate copolymer. The ethylene-vinyl acetate copolymer can be produced by a known polymerization, such as solution polymerization, suspension polymerization, emulsion polymerization and the like, and saponification of ethylene-vinyl acetate copolymer can be also carried out by a known method. Typically, EVA resins are produced via high pressure autoclave and tubular processes.

Polyamide is a high molecular weight polymer having amide linkages along the molecular chain structure. Polyamide is a polar polymer. Nylon polyamides, which are synthetic polyamides, have favorable physical properties of high strength, stiffness, abrasion and chemical resistance, and low permeability to gas, for example oxygen.

As shown in FIG. 1, the web material 100 can include a series of transverse seals 118 disposed along the longitudinal extent of the web material 100. Each transverse seal 118 extends from the longitudinal edge 112 towards an inflation channel 114. In the embodiment shown, the inflation channel 114 extends along the first longitudinal edge 110 opposite the second longitudinal edge 112, and thus the transverse seal 118 extends from the longitudinal edge 112 toward the first longitudinal edge 110. In some embodiments, the flexible structure 100 can include an inflation channel 114 located elsewhere in relation to the longitudinal edge(s) 112 and/or 110. For example, the inflation channel can extend along the length of the structure 100 at an intermediate location (e.g., midway) between the longitudinal edge(s) 112 and/or 110. In some embodiments, the flexible structure 100 can, additionally or alternatively, include an inflation channel 114 along the second longitudinal edge 112. In the illustrated embodiment, each transverse seal 118 has a first end 122 proximate the second longitudinal edge 112 and a second end 124 spaced a transverse width 103 from the first longitudinal edge 110 of the web material 100. An inflatable chamber 120 is defined within a boundary formed by the seal or fold at longitudinal edge 112 and pair of adjacent transverse seals 118. When a chamber is inflated, and the plies 105,107 of the web material 100 are sealed together to form a continuous longitudinal seal 170 (shown as a phantom line in FIG. 1), e.g., at a seal that closes the inlet channels 125, the web material forms an inflated cushion 121. The web can be converted to have a different sealing pattern between the first and second plies, for example to provide different types of void fill or protective packaging cushions. In some embodiments, the inflatable chambers are provided without internal seals, for instance. In some cases the converted web has a seal pattern devoid of internal seals and with a large aspect ratio to provide larger inflatable pillows.

Each transverse seal 118 of the embodiment in FIG. 1 is substantially straight and extends substantially perpendicular to the second longitudinal edge 112 in the transverse direction 111. In other embodiments, other arrangements of the transverse seals 118 can be used. For example, in some embodiments, the transverse seals 118 can have undulating or zigzag patterns.

The transverse seals 118 as well as sealed longitudinal edges 110, 112 can be formed by any of a variety of techniques known to those of ordinary skill in the art. Such techniques include, but are not limited to, adhesion, friction, welding, fusion, heat sealing, laser sealing, and ultrasonic welding.

An inflation region, such as a closed passageway, which can be a longitudinal inflation channel 114, can be provided. Alternatively, the inflation region can be provided by an open lateral edge, such as with flaps that are held over a transverse nozzle to blow gas between the plies 105,107. The longitudinal inflation channel 114, as shown in FIG. 1, is disposed between the second end 124 of the transverse seals 118 and the first longitudinal edge 110 of the web material. Preferably, the longitudinal inflation channel 114 extends longitudinally along the longitudinal edge 110, and an inflation outlet 116 opening is disposed on at least one end of the longitudinal inflation channel 114. The longitudinal inflation channel 114 has a transverse width 103 corresponding to the transverse width between the longitudinal edge 110 and second ends 124 of the transverse seals 118.

The longitudinal edge 112 and transverse seals 118 cooperatively define boundaries of inflatable chambers 120. As shown in FIG. 1, each inflatable chamber 120 is in fluid communication with the longitudinal inflation channel 114 via an inlet channel 125 defined between an internal seal 123 and a transverse seal 118, opening towards the longitudinal inflation channel 114, thus permitting inflation of the inflatable chambers 120 as further described herein. The inlet channels 125 have a transverse width 119 defined between respective ends 131, 133 of the internal seals 123. The internal seals 123 have transverse ends 142,144. The transverse end 144 is adjacent to the inflation channel 114, and the transverse end 142 defines the beginning of the first chamber portion 130 located transversely from the inflation channel 114. The inlet channels 125 have a longitudinal length 135 defined between a transverse seal 118 and an edge of an adjacent internal seal 123. The seal pattern in the web material 100 can vary. For example, the longitudinal distance between adjacent transverse seals 118 can be smaller or larger depending on the desired properties of the finished cushions 121. Smaller spacing between transverse seals 118 can result in cushions 121 that are thinner and more flexible. Larger spacing between transverse seals can result in cushions 121 that are thicker and relatively less flexible, but can provide more cushioning. In some embodiments, the longitudinal spacing between transverse seals 118 is as low as ¼ or ½ of an inch or up to 1 inch, 2 inches, or greater than 10 inches. Other suitable spacing can alternatively be selected.

The web material 100 includes a portion 151 extending from the first longitudinal edge 110 to approximately the longitudinal seal 170. As discussed below, the portion 151 is received within an inflation side gap 211 in the inflation and sealing device 101 formed between a sealer guide member 228 and a compression element. The web material 100 includes a portion 153 within which the longitudinal seal 170 is formed. The web includes a portion 157 received between a sealer guide member 222 and a portion of a compression element 204. The portion 153 is received between opposing compression elements 204 and 206 of a heat sealer 202. The web material 100 includes a portion 155 received in within a director gap 269 defined by opposing faces 265, 267 of director portions 264 and 266 of a web material director 261 to align and support the web material 100 as it is inflated. The director portions 264,266 are opposed to one another on opposite sides of the thickness of the web material 100. In this embodiment, director portions 264,266 extend transversely past the end of the inlet channel 125. The portions 151, 153, 155, and 157 extend longitudinally down the web 100. The portion 155 is also received, at a different longitudinal location in the inflation and sealing device 101 in a web control gap 201 defined between a compression element 204 and a web control guide 212 to prevent transverse movement of the web material 100 as the web is sealed in the heat sealer 202, discussed below. An inflation nozzle 240 being inserted into the inflation channel 114 can also prevent the web material 100 from moving transversely as the web material 100 is sealed.

In the embodiment of FIG. 1, the flexible structure 100 includes internal seals 123,128 formed in an interior portion of an inflatable chamber 120. The internal seals 123,128 are longitudinally separated from the transverse seals 118. In other embodiments, the internal seals 128 can be adjacent or connected to respective transverse seals 118 and extending toward or into the respective inflatable chamber(s) 120. The internal seals 128 define perpendicularly lower regions of the inflatable chamber 120 corresponding to smaller width or restrictions in the width of the chamber, which creates bendable areas, which can be aligned to create the bendable lines, thereby increasing the flexibility of web material 100 such that it can be more easily bent or folded. Such flexibility allows for the web material 100 to wrap around regular and irregular shaped objects. The internal seals 123,128 cooperate with the transverse seals 118 to define billowed chamber portions 130 within an inflatable chamber 120 with an inflated height generally higher than other portions of the inflatable chamber 120. The chamber portions 130 are in fluid communication with adjacent chamber portions 130 via intra-chamber passages 140 as well as with the inflation channel 114 via the inlet channels 125. The internal seals 128 pinch down the plies 105,107 decreasing the height of the chamber portions 130 and forming hinges to allow the inflated cushions 121 to conform to objects. The internal seals 128 can be any shape (e.g., rectangular as shown, circular, ovular, or having any other regular or irregular shape) or size. In accordance with some embodiments, the transverse seals 118 are continuous, without interruptions from internal seals 128 or the like.

In the embodiment shown in FIG. 1, the web material 100 includes weakened portions 126 (e.g., lines of weakness, such as perforation lines) disposed along the longitudinal extent of the web material 100 and extending transversely across the first and second plies of the web material 100. Each weakened portion 126 extends from the second longitudinal edge 112 and towards the first longitudinal edge 110, e.g., partially or fully along the length of the transverse seals 118. In the illustrated embodiment, the weakened portions 126 are longitudinally offset from adjacent transverse seals a longitudinal distance 117 with inflatable chambers 120 therebetween to form several inflatable cushions 121 that can be separated along the lines of weakness 126. In other embodiments, the weakened portions can extend through a portion of a transverse seal 118. In the illustrated embodiment, the weakened portions 126 are in the form of transverse lines of weakness and each transverse line of weakness in the flexible structure 100 is disposed between a pair of adjacent inflatable chambers 120. For example, each line of weakness 126 is disposed between two adjacent transverse seals 118 and between two adjacent inflatable chambers 120, as depicted in FIG. 1. The transverse lines of weakness 126 facilitate separation of adjacent inflatable cushions 121. In some embodiments, thicker transverse seals 118 can be used, which define a transverse sealed portion and the weakened portions 126 can be provided along, at least part, of the transverse sealed portion of the flexible structure 100.

The weakened portions 126 can be provided in a variety of configurations known by those of ordinary skill in the art. For example, in the embodiment of FIG. 1, the weakened portions 126 are provided as transverse lines of weakness 126 that include rows of perforations, in which a row of perforations includes alternating lands and slits spaced along the transverse extent of the row. The lands and slits can occur at regular or irregular intervals along the transverse extent of the row. The lands form small connections across the weakened portion 126. Alternatively, in some embodiments, the weakened portions 126 can include score lines or the like formed in the flexible structure 100.

The transverse lines of weakness 126 can be formed by a variety of techniques known to those of ordinary skill in the art. Such techniques include, but are not limited to, cutting (e.g., techniques that use a cutting or toothed element, such as a bar, blade, block, roller, wheel, or the like) and/or scoring (e.g., techniques that reduce the strength or thickness of material in the first and second plies, such as electromagnetic (e.g., laser) scoring and mechanical scoring).

Preferably, the transverse width 129 of the inflatable chamber 120 is typically less than 50 inches. In some embodiments, the transverse width 129 is above 10 inches. In some embodiments, the transverse width 129 is above 12 inches. In some embodiments, the transverse width 129 is below 10 inches. In some embodiments, the transverse width 129 is below 15 inches. In some embodiments, the transverse width 129 is below 48 inches. In one embodiment, the transverse width 129 is about 17 inches. In some embodiments, the transverse width 129 is at least 3 inches. Other embodiments have different transverse widths, as desired. In some embodiments, the longitudinal length 127 between weakened portions 126 is less than about 48 inches. In some embodiments, the length 127 is at least about 2 inches. In some embodiments, the length 127 is above 5 inches. In some embodiments, the length 127 is above 6 inches. In some embodiments, the length 127 is above 10 inches. In some embodiments, the length 127 is below 30 inches. In addition, the inflated heights of the inflated chamber 120 can be at least about 1 inch up to about 3 inches, and in some cases up to about 6 inches. It is appreciated that other suitable dimensions can be used.

Figure 2:
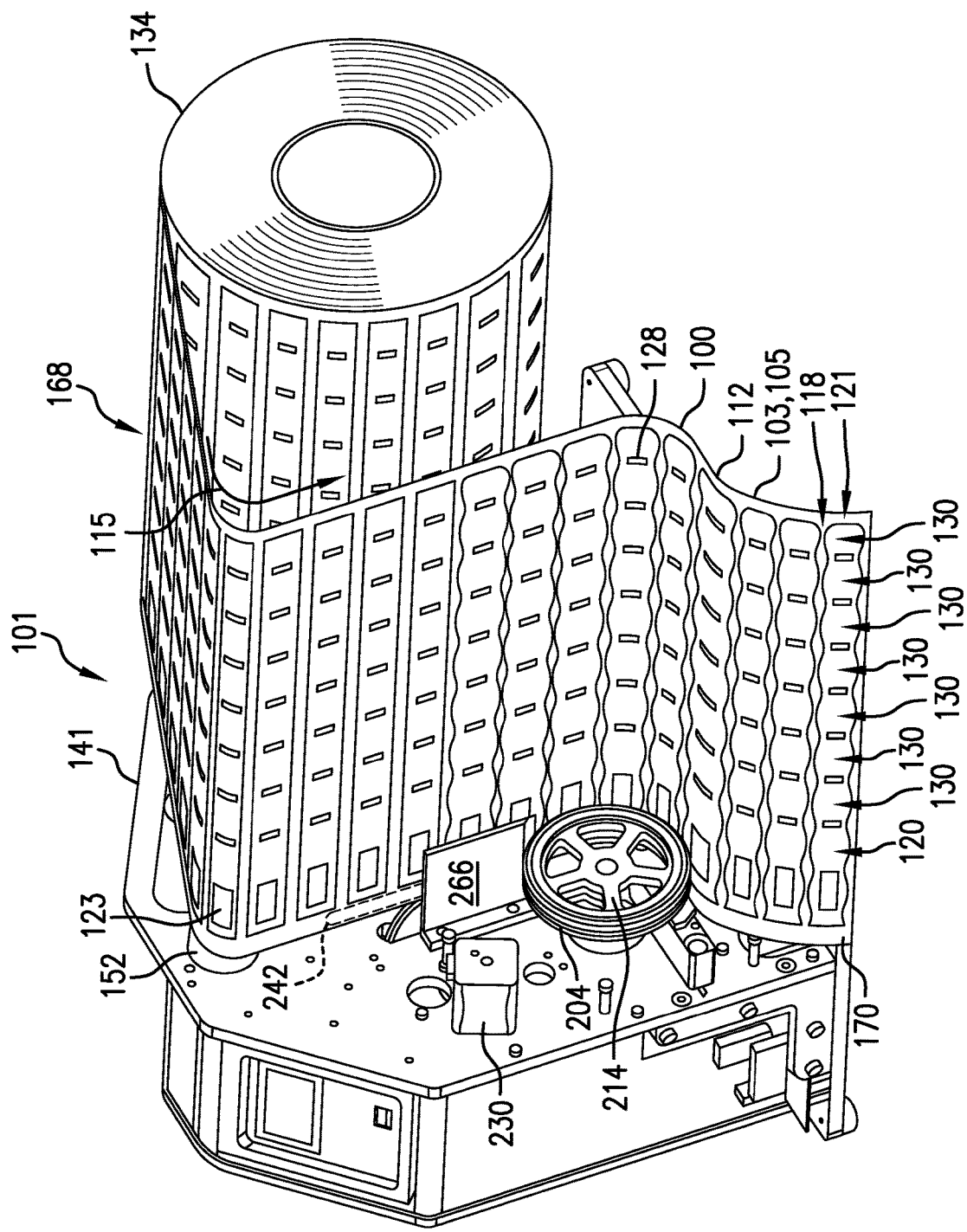
FIG. 2 is an isometric view of an embodiment of an inflation and sealing device with a roll of the web material of FIG. 1 loaded.
Figure 3:
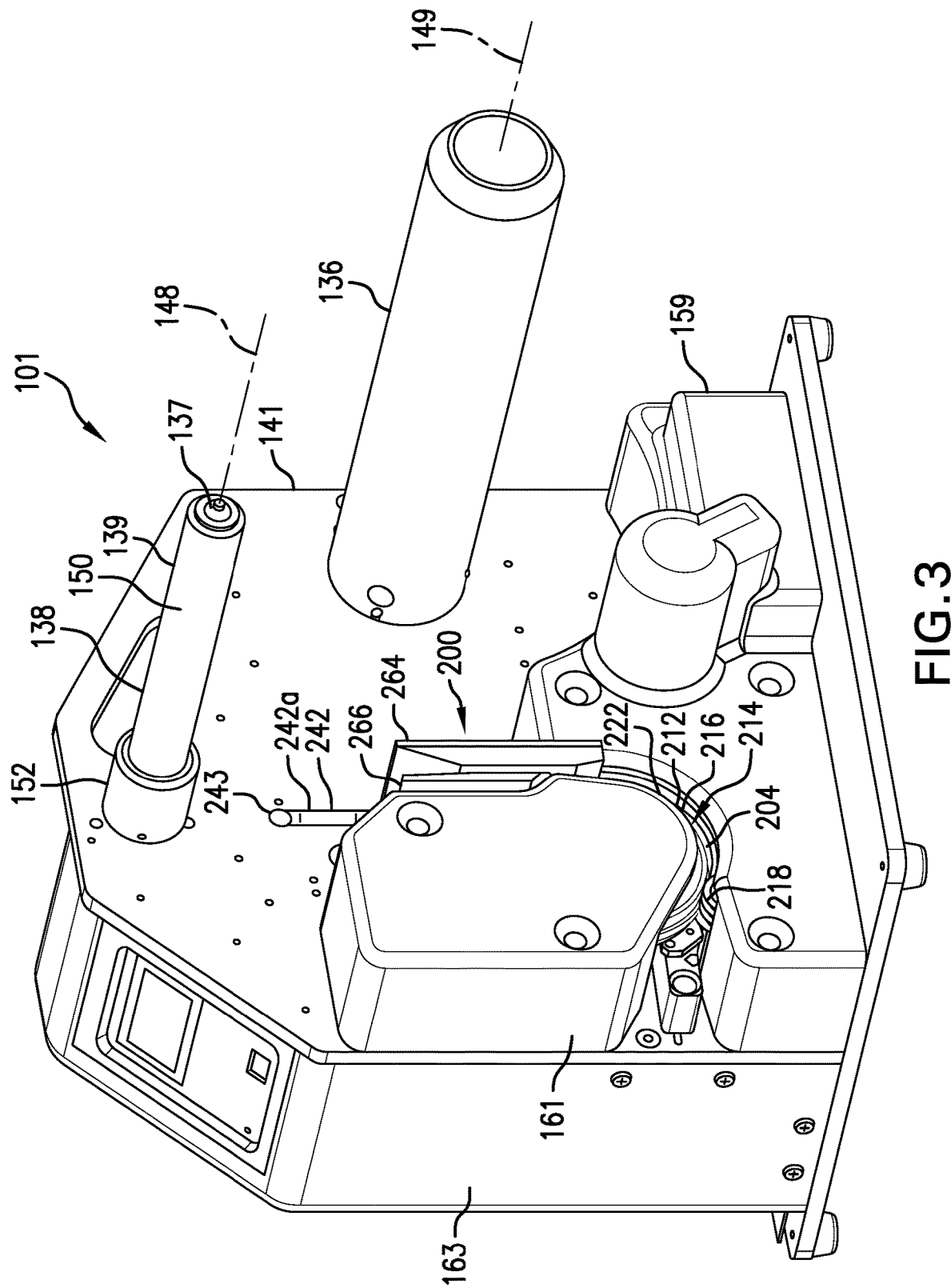
FIG. 3 is an isometric view of the device of FIG. 2 with covers installed.

Turning now to FIGS. 2-14 an inflation and sealing device 101 for converting the flexible structure 100 of uninflated material into a series of inflated cushions 121 is provided. The uninflated flexible structure 100 can be a bulk quantity supply of uninflated material 134. For example, as shown in FIG. 2, the uninflated flexible structure 100 can be provided as a roll 134 of supply material, which can be rolled around an inner support tube. In some embodiments, the supply material is rolled into a roll with a hollow center. The support tube or hollow center of the roll 134 of material is supported on a supply support element 136, in this case a roll axle 136, of the inflation and sealing device 101. The roll axle 136 accommodates the center or tube of the roll of web material 100. In other embodiments, different structures can be used to support the roll of material, such as a tray, fixed spindle or multiple rollers, or a supply material of different configuration (e.g., folded supply material). FIG. 3 shows the inflation and sealing device 101 without the flexible structure 100, such as the roll 134, loaded on the device. In some embodiments, the flexible structure 100 of uninflated material is delivered from a folded form such as a fanfolded configuration.

FIG. 3 shows an embodiment of an inflation and sealing device 101. In FIG. 3, various covers 159, 161, and 163 are in place. The cover 163 conceals and protects a rear portion (shown in FIG. 5 of the inflation and sealing device 101). The covers 159 and 161 conceal and protect portions of the sealing assembly 200, and help define a material path 115 that the web material 100 follows as it moves through the device 101. The inflation and sealing device 101 includes handling elements, with each of the handling elements including web-supporting portions. The web-supporting portions support and direct an inflatable web 100 of material in a longitudinal direction 109 along a path (e.g., path 115 in FIG. 2). The handling elements can include a supply support element 136 that supports a supply 134 of the web 100 in an uninflated state. An inflation and sealing assembly 200 is operable to inflate the web 100 with a fluid by directing the fluid between superimposed plies 105, 107 of the web 100 and to seal the plies 105, 107 together to seal the fluid therein. Two of the web-supporting portions (e.g., a roll axle 136 and guide member 138) are arranged relative to a supporting structure 141 and each other such that the supply material 134 experiences a different amount of tension along the transverse direction 111 as it passes from the first to the second web-supporting portion. The relative position of the two web-supporting portions causes a difference in tension in two portions of the web 100 disposed transversely of each other in a substantially same longitudinal location along the path. In further embodiments of the present disclosure, the differential tension can be achieved by providing the guide member 138 with one or more expansion elements as described further below. In some examples, the resulting shape of the guide member 138 can be configured to define a slightly shorter longitudinal travel distance between the first and second adjacent web-supporting portions at one transverse end of the web as compared to the longitudinal travel distance between the first and second adjacent web-supporting portions at another (e.g., opposite) transverse location of the web, as will be further described.

Referring back to FIG. 3, the inflation and sealing device 101 can include a bulk material support 136. The bulk supply 134 of uninflated material is supported by the bulk material support 136. In some embodiments, the bulk material support is provided as a tray operable to hold the uninflated supply 134, which tray can be provided by a fixed surface or a plurality of rollers for example. To hold a roll 134 of material the tray can be concave around the roll or the tray can be convex with the roll 134 suspended over the tray. The bulk material support 136 can include multiple rollers, which suspend the supply of web material 100. The bulk material support 136 can include a single roller that accommodates the center of the roll 134 of web material 100, e.g., as shown in FIG. 2. In this example, the bulk support material is a roll axle 136 passing through the core or center of the roll 134 of the material 100. Typically, the core is made of cardboard or other suitable materials. The bulk material support 136 rotates about an axis 149.

The web material 100 is pulled through the inflation and sealing device 101 by a drive 160. In some embodiments, intermediate members such as a guide member 138 (e.g., which can include a fixed rod, or a roller) can be positioned between the supply 134 and the drive 160. For example, the optional guide member 138 can extend generally perpendicularly from the support structure 141. The guide member 138 can be positioned to guide the flexible structure 100 away from the roll 134 of material 100 and along a material path 115 along which the material is processed, also referred to as a longitudinal path. As shown in FIG. 3, the guide member 138 is arranged between the material support 136, which supports the supply material, and the inflation and sealing components of the inflation and sealing device 101. The guide member 138 can be arranged to route the web material 100 from the supply toward the inflation and sealing assembly 200 such that the web material 100 follows a curved longitudinal path. The guide member 138 can include one or more surfaces, which define web-supporting surfaces (e.g., surfaces extending along the side of the guide member around which the web 100 bends as it traverses the path 115). In some examples, and as described further below, the guide member 138 can include one or more expansion elements. The one or more expansion elements provide at least a portion of the web-supporting surface of the guide member and can configure the guide member to provide variable tension on the web material 100 at different transverse locations of the web material 100.

The guide member 138 or a portion thereof can be movably coupled to the inflation and sealing device 101, such that the guide member 138 or the movable portion thereof can move (e.g., spin, translate, oscillate, etc.) in relation to the support structure 141 when the web material 100 is being drawn from the roll 134 by drive the 160. In some examples, the guide member 138 includes a guide roller, which includes an axle or rod portion 137 and a rotatable or roller portion 139 coaxially coupled to the rod portion 137 such that the roller portion 139 spins about a common axis 148 of the rod and roller portions. The roller portion 139 provides a web-supporting surface 150 that supports the web 100, in this case moving with the web 100 as it is being drawn from the roll 134. The moving web-supporting surface 150 can reduce or eliminate sliding friction between the guide member 138 and the web 100. However, in other embodiments, guide members with a fixed web-supporting surface 150 are also envisioned. For example, the guide member can include a rod similar to the axle 137 without the rotatable portion 139. A low friction material, such as polytetrafluoroethylene (PTFE), can be provided (e.g., in the form of a coating or a strip of material adhered to) on at least a portion of the web-supporting surface 150 of a non-rotatable rod, to reduce sliding friction. In yet other embodiments, the non-rotatable portion or rod of the guide member and the rotatable portion (e.g., roller) may not be coextensive. For example, the only rotating portion of the guide member 138 can be the expansion element 152. Web-supporting surface(s) of the guide member that do not rotate as the web is traveling over the guide member can be coated or otherwise provided with friction-reducing material(s). In some embodiments, the guide member 138 can additionally or alternatively be coupled to the inflation and sealing device 101 such that it moves in a direction normal to the longitudinal path 115 traveled by the supply material.

In the embodiments shown, a guide member 138 according to the present disclosure includes one or more expansion elements 152 as will be described further below. In some embodiments, the expansion element 152 provides some or all of the web-supporting surface 150 of the guide member 138. A guide member 138 according to the principles of the present disclosure can thus be configured to control the web material 100, such as to prevent or reduce sagging of the web material 100 between the roll 134 and the inflation nozzle 240 of the inflation and sealing device 101.

In various embodiments, the stock material (e.g. web material 100) can advance downstream from the supply of material such as the roll 134 without engaging a guide roll but can instead be advanced directly into the inflation and sealing assembly 200. As used herein, the terms upstream and downstream are used relative to the direction of travel of the web material 100. It is appreciated that other suitable structures can be utilized in addition to or as an alternative to use of brakes, guide rollers, or web feed mechanisms in order to guide the web material 100 toward a sealing zone 276 which can form part of the sealing assembly 200. The sealing zone 276 can be a pinch zone where the plies 105, 107 of the web material are pinched or compressed and simultaneously heated such that they fuse together. Inflation fluid can also be supplied in the sealing zone 276. As indicated, because the web material 100 can sag, bunch up, drift along the guide roller 138, shift out of alignment with the sealing zone 276, alternate between tense and slack, or become subject to other variations in delivery, the inflation and sealing assembly 200 may need suitable adjustability to compensate for these variations.

The web material 100 is advanced through the inflation and sealing assembly 200 by a drive 160. The inflation and sealing assembly 200 can incorporate the drive 160 or the two systems can operate independently. The drive 160 includes one or more devices operable to motivate the flexible structure 100 through the inflation and sealing device 101. In the embodiment shown, the drive 160 includes a backing element such as the backing wheel 214 driven by a motor 154 via a belt 158 (see, e.g., FIGS. 4,5). In other embodiments the drive 160 can include a different roller, wheel or drum, or more than one of the same. In some embodiments the backing element can be stationary. In some embodiments the drive 160 can include a belt drive, where the belt is in contact with a portion of the web 100. In some embodiments, multiple belts can be used to motivate the web material 100 through the inflation and sealing device 101. In other embodiments, a belt motivates the web material 100 along the material path, and one or more rollers follow, being driven by the motion of the web material 100. In other embodiments, a combination of belts, rollers, or drums move the web material 100 through the inflation and sealing device 101 along the material path 115. In some embodiments the various belts, drums, or rollers can be driven by a single motor and be connected with other belts, pulleys, or gears to transfer rotational motion throughout a connected drive. In other embodiments, the belts, drums or rollers can be driven by individual motors or servos.

For example, in various embodiments, the drive includes one or more motor driven rollers operable to drive the flexible material 100 in a downstream direction along a material path 115. One or more of the rollers or drums can be connected to the drive motor 154 such that the one or more rollers drive the system. This embodiment is beltless. In accordance with various embodiments, the drive 160 drives the web material 100 without a belt contacting the flexible structure. In another example, the system has a belt that does not contact the web material 100 but instead drives the rollers. In another example, the system has a belt on some drive elements but not others. In another example, the system can have belts interwoven throughout the rollers allowing the material to be driven through the system by the belts.

The inflation and sealing device 101 includes an inflation and sealing assembly 200. Preferably, the inflation and sealing assembly 200 is configured for continuous inflation of the web material 100 as it is unraveled from the roll 134. The roll 134, preferably, comprises a plurality of inflatable chambers 120 that are arranged in series, e.g., in a chain. To begin manufacturing the inflated cushions 121 from the web material 100, the inflation outlet 116 of the web material 100 is inserted into an inflation assembly, such as an elongate guide 240 which is inserted into the inflation channel 114 for guiding the web material through the inflation and sealing device 101. The transverse width of the inflation channel 114 can be selected to fit around the nozzle suitably closely to slide over the nozzle 240 and allow fluid to flow into the inflatable chambers 120. In this embodiment, the elongate guide is also an inflation nozzle 240, and is advanced along the material path 115. The nozzle 240 has an elongated portion, which includes one or more of a nozzle base 244, a flexible portion 242a, and/or a tip 242. The elongated portion can help guide the flexible structure 100 to a sealing zone 276. At the same time the nozzle 240 can inflate the flexible structure through one or more fluid outlets 246a,b. In this embodiment, the fluid outlets 246a,b are openings in the nozzle 240. The one or more outlets 246a,b pass from the inflation channel out of one or more of the nozzle base 244, the flexible portion 242a, or the tip 242. The tip 242 includes a terminal portion 243 that can act as a guide to initiate guiding of the nozzle 240 into the inflation channel 114. The terminal portion 243 is a hemispherical plug in the embodiment shown, but other shapes are contemplated. In the embodiment shown in the figures, preferably, the web material 100 is advanced over the inflation nozzle 240 with the inflatable chambers 120 extending transversely with respect to the inflation nozzle 240 and the side outlets 246a,b (best seen in FIGS. 4, 6, 12 and 13). The side outlets 246a,b direct fluid in a transverse direction with respect to a nozzle base 244 into the inflatable chambers 120 to inflate the inflatable chambers 120 as the web material 100 advances along the material path 115 in a longitudinal direction. In other embodiments, the outlets 246a,b direct fluid in other directions with respect to the nozzle base 244. The inflation nozzle 240 inserts a fluid, such as pressurized air, into the uninflated web material 100 through nozzle outlets, inflating the material into inflated cushions 121. The inflation nozzle 240 can include a nozzle inflation channel that fluidly connects a fluid source, which enters at a fluid inlet, with the nozzle outlets (e.g., side outlets 246a,b). It is appreciated that in other configurations, the fluid can be other suitable pressured gas, foam, or liquid. The inflated web material 100 is then sealed by the sealing assembly 200 in the sealing zone 276 to form a chain of inflated cushions 121. Typically a nozzle has an outer diameter of about ¼ to ½ of an inch. In this embodiment, the outer diameter of the nozzle is about 3/16 of an inch. Other suitable nozzle diameters can alternatively be selected.

The side inflation area 168 (shown in FIG. 2) is shown as a portion of the inflation and sealing assembly along the path 115 adjacent the side outlets 246a,b in which fluid from the side outlets 246a,b can inflate the inflatable chambers 120. In some embodiments, the inflation area 168 is the area disposed between the nozzle tip 242 and sealing zone 276. The web material 100 is inserted around the inflation nozzle 240 at the nozzle tip 242, which is disposed at the forward most end of the inflation nozzle 240.

The inflation nozzle 240 can be at least partially flexible. As shown in FIG. 3, the inflation nozzle 240 includes a tip 242 with a flexible portion 242a that allows the nozzle 240 to adapt to the direction of the web material 100 as the structure is fed towards and over the nozzle 240, thereby making the nozzle 240 operable to compensate for or adapt to variations in the feed angle, direction, and other variations that the web material 100 encounters as it is fed towards and over the nozzle 240. In some examples, as described above, the guide roller 138 can be transversely movable relative to the sealing assembly 200 such as to adjust or eliminate any variations in delivery of the supply material.

As shown in FIGS. 4, 6-9, and 12-13, the side outlets 246a,b can extend longitudinally along the nozzle base 244 a longitudinal distance from the nozzle tip 242. In various embodiments, the side outlets 246a,b originates proximate, or in some configurations, overlapping, the sealer assembly such that the side outlet 246a,b continues to inflate the inflatable chambers 120 about right up to the time of sealing. This can maximize the amount of fluid inserted into the inflatable chambers 120 before sealing, and minimizes the amount of dead chambers, i.e., chambers that do not have sufficient amount of fluid. Although, in other embodiments, the outlets 246a,b can extend downstream past the entry to the sealing zone 276. The beginning point of the web is upstream and it flows downstream as it is inflated, sealed, cooled and removed from the inflation and sealing device 101.

The length of the side outlet 246a can be a slot having a length that extends a portion of the inflation nozzle 240 between the tip 242 and the sealing zone 276. In one example, the slot length can be less than half the distance from the tip 242 to the sealing zone 276. In another example, the slot length can be greater than half the distance from the tip 242 to the sealing zone 276. In another example, the slot length can be about half of the distance from the tip 242 to the sealing zone 276. The side outlet 246a can have a length that is at least about 30% of the length of the inflation nozzle 240, for example, and in some embodiments at least about 50% of the length of the inflation nozzle 240, or about 80% of the length of the inflation nozzle 240, although other relative sizes can be used. The side outlets 246a,b expel fluid out the lateral side of the nozzle base 244 in a transverse direction with respect to the inflation nozzle 240 through the inlet channel 125 of each of the inflatable chambers 120 to inflate the inflatable chambers 120. The tip 242 of the inflation nozzle 240 can be used to pry open and separate the plies 105,107 in an inflation channel 114 as the tip 242 as the material is forced over the tip 242. In some embodiments, a longitudinal outlet can be provided in addition to or in the absence of the lateral outlet, such as the side outlets 246a,b, which can be downstream of a longitudinal outlet and along the longitudinal side of the nozzle wall of the nozzle base 244 of the inflation nozzle 240.

Fluids such as air can be supplied to the inflation and sealing device 101 by an external device such as an air compressor, blower, house air system, foam system, or the like. In the embodiment shown, fluid is supplied to the inflation and sealing device 101 via a fluid coupling 172. The fluid is then routed to the nozzle 240 via internal conduits such as piping or tubing (not shown). The flow rate of the fluid is typically about 2 to 20 cubic feet per minute (CFM). But much higher flow rates can be used, for example, when a higher flow rate fluid source is used, the flow rate can be in excess of 100 cfm. In other embodiments, the inflation and sealing device 101 can include an internal fluid source such as a blower or compressor.

While various examples are described herein and shown in the figures it should be appreciated that these examples should not be limiting and that the nozzle 240 and inflation assembly can be configured in accordance with any known embodiments or developed embodiments that can benefit from the disclosure herein as a person of ordinary skill in the art could apply based on the disclosure herein.

As shown in FIGS. 3, 4, 6, 12-14, the inflation and sealing device 101 includes a web material director 261 with a pair of director portions 264,266 that are elongated in the longitudinal direction 109 of the material path 115 and positioned longitudinally with respect to a web control guide 212 (discussed below). The director portions 264,266 orient the transverse dimension of the web material 100 in the material path 115 as it is passed over the inflation nozzle 240. The director portions 264,266 orient the inlet channels 125 with the outlets 246a,b of the nozzle 240. The director portions 264,266 extend from the supporting structure 141 a transverse distance 271 (see, FIG. 14) sufficient to engage an inflatable portion of the web material 100 as it inflates, before it is sealed. As shown, the director portions 264,266 extend perpendicular from the support structure 141, although in other embodiments, the director portions can extend in non-perpendicular angles from the support structure. The web material 100 passes between the director portions 264,266 as it moves through the inflation and sealing device 101 in the longitudinal direction 109.

Figure 14:
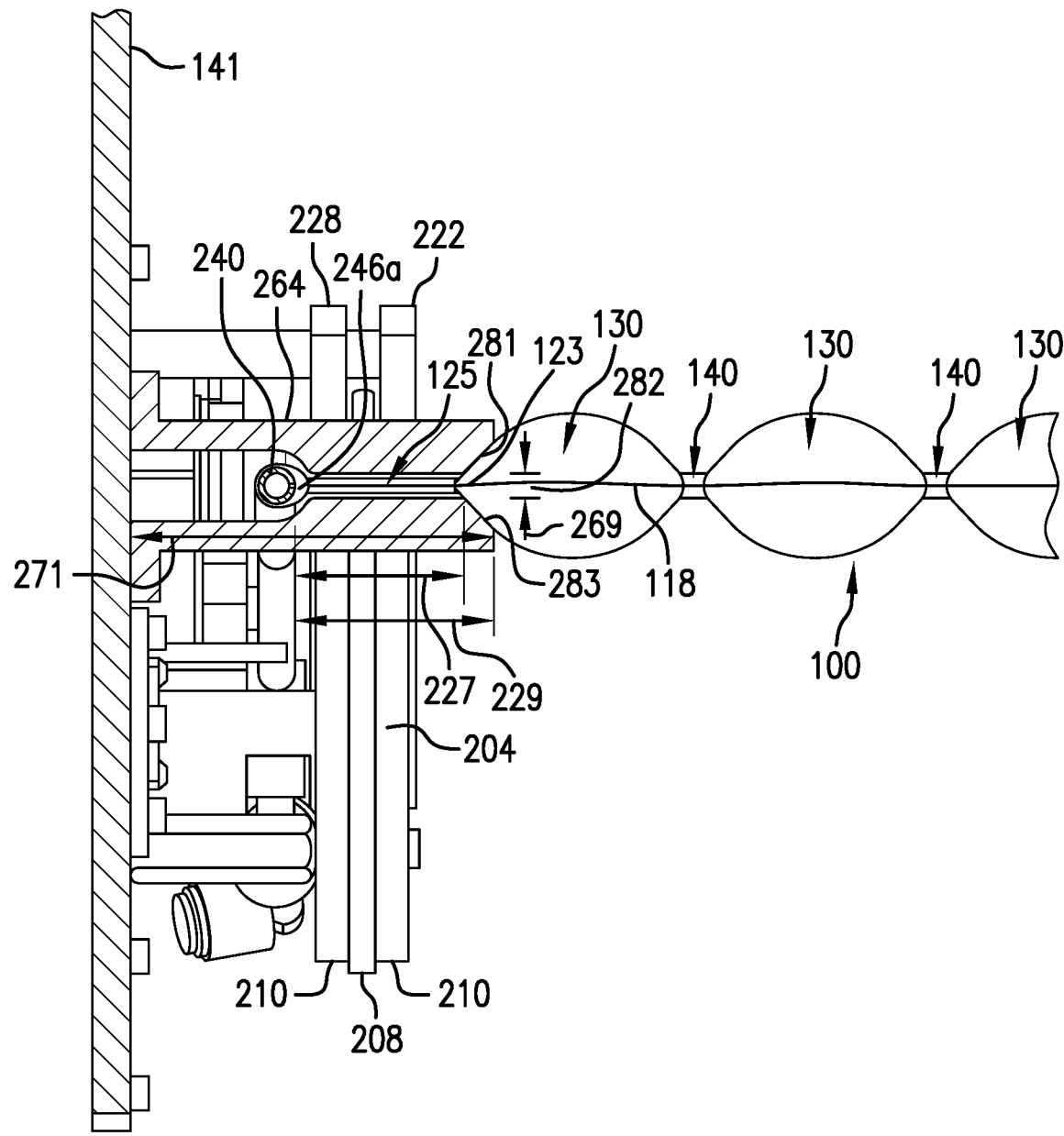
FIG. 14 is a simplified top section view of a portion of the inflation and sealing assembly of the device of FIG. 2.

The director portions 264,266 include leading ramp faces 273,275. The leading ramp faces 273,275 are slanted with respect to one another, tapering in the longitudinal direction 109 such that the distance between them becomes progressively narrower as the web material 100 initially enters between the director portions 264,266 and then passes therethrough in a longitudinal direction 109. The web material director 261 includes an exit ramp face 279 that is slanted away from the web material 100 as it exits from between the director portions 264,266. The director portions 264,266 include transverse ramp faces 281,283. The transverse ramp faces 281,283 are slanted with respect to one another, tapering in the transverse direction 111, such that the director gap 269 becomes progressively narrower or wider with respect to transverse portions of the web 100. The transverse ramp faces 281,283 thereby form a longitudinal trough 282 that receives a portion of the web material 100. In this embodiment, as shown in FIG. 14, the chamber portion 130 closest to the inflation channel 114 is received between the ramp faces 281,283 to orient the web 100 with respect to the outlet 246a in the nozzle 240, and the sealing assembly 200. The various ramp faces 273,275,281,283 can help to initially thread the web material 100 through the inflation and sealing device 101. The ramp faces can help initiate alignment of the web material as inflation is initiated, gradually guiding the material 100 into an aligned position to promote sealing of the plies 105,107 and transit through the inflation and sealing device 101.

In the embodiment shown, the nozzle 240 is positioned between the director portions 264,266. The opposing faces 265,267 are located equidistant from a centerline of the nozzle 240. In other embodiments, the centerline of the nozzle 240 can be located closer to one of the opposing faces 265,267 and further from the other of the opposing faces 265,267 such that the nozzle is off-center in a thickness direction with respect to the web material 100.

As the web material 100 is inflated by the nozzle 240, the plies 105,107 press against the respective opposing faces 265,267. The opposing faces 265,267 and/or the ramp faces impart reactive forces to the inflating portions of the web material 100 thereby keeping the transverse axis of the web material 100 aligned with transverse axes of the components of the sealing assembly 200.

The director portions 264,266 align the web material 100 as it is inflated and sealed. The director portions 264,266 have respective opposing faces 265,267 that are spaced apart from one another by a director gap 269 to constrain a thickness of the material path 115. In this embodiment, the director gap 269 is larger than a height of the inflated inlet channels 125, as shown in FIG. 14. In other embodiments, the director gap can be less than the height of inflated inlet channels 125 (when the channels 125 are unconstrained). In other embodiments, the director gap 269 is the same size as the height of an inflated inlet channel 125. The director gap 269 can be selected in accordance with properties of the web material 100. For example, a longitudinal distance between transverse seals 118 can influence the height or thickness dimension of an inflated chamber 120, chamber portion 130, and/or the inlet channels 125. Relatively wide longitudinal spacing between transverse seals 118 can result in relatively thick inflated cushions 121 in the thickness direction 113. Likewise, closer longitudinal spacing between transverse seals 118 results in thinner inflated cushions in the thickness direction 113. Likewise, the height of the inflation channel 114 during inflation can be influenced by the transverse width of the inflation channel from the longitudinal edge 110 to the edge of an internal seal 123. The director gap 269 can be selected accordingly to accommodate thicker or thinner cushions 121 based on the longitudinal spacing between transverse seals 118. In this embodiment, the director gap 269 is smaller than the outside diameter of the nozzle 240. In this embodiment, the director gap is larger than the height of the inflated inlet channels 125, but small enough to that inlet channels 125 align with the outlet 246a, and when pressurized orients the rest of the web 100. As shown in FIG. 14, the opposing faces 265,267 extend transversely from the outer surface of the nozzle 240 at the opening 246a a director gap width 227 to the narrowest part of the longitudinal trough 282 formed by the transverse ramp faces 281,283 and a distance 229 to the widest part of the longitudinal trough 282. In this embodiment, the director gap width 227 and the distance 229 are such that the transverse edge 142 of the internal seals 123 is located at approximately the same transverse location as the narrowest part of the trough 282. Thus, the chamber portion 130 transversely closest to the inflation channel 114 is received in the longitudinal trough 282, which orients the web material as it rides in the trough 282. In this embodiment, the ratio of the director gap width 227 to the director gap 269 is about 10:1. In other embodiments, the ratio is at least 5:1, 8:1, or most preferably 9:1-11:1. In some embodiments, the ratio can be up to about 15:1. Other suitable ratios can be selected based on the seal pattern in the web material 100. In this embodiment, the director gap 269 is about ¼ of an inch. In other embodiments, the director gap 269 can at least ⅛, ½, or 1 inch or larger. Other suitable director gaps can be selected as suitable for the web material 100 being used. The director gap 269, the director gap width 227, the dimensions of the longitudinal trough 282, and the ratios therebetween can be selected to allow the web material 100 to pass through the web material director 261 without bunching, snagging, wrinkling, kinking, wrapping, or burning.

The opposing faces 265,267 are substantially flat and smooth in this embodiment. The opposing faces 265,267 are preferably parallel or at slight angles to each other, and positioned and spaced sufficient to orient the transverse axis of the path 115 as desired. In some embodiments the director gap 269 is curved, along with the inflation nozzle 240, where a curved path is desired in that region.

After the web material passes out from between the director portions 264,266, it enters the sealing assembly 200, where the plies 105,107 are sealed to form a continuous longitudinal seal 170, thereby trapping the fluid and forming cushions 121. Preferably, the web material 100 is continuously advanced through the sealing assembly along the material path 115 and past the heat sealer 202 at a sealing zone 276 to form the continuous longitudinal seal 170 along the web material 100 by sealing the first and second plies 105,107 together. Preferably, the longitudinal seal 170 is disposed a transverse distance from the first longitudinal edge 102,106 and most preferably the longitudinal seal 170 is disposed along the inlet 125 of each of the inflatable chambers 120.

The inflation and sealing assembly 200 includes a heat sealer 202 to form the longitudinal seal 170 in the web material 100 in a sealing zone 276, trapping fluid between the plies 105,107 and thus forming the cushions 121. The heat sealer 202 includes opposing compression elements 204, 206 in compression against each other to compress the overlapping plies 105,107 together in a sealing zone 276. The heat sealer 202 includes a heating element 270 that provides heat energy to the sealing zone 276. The opposing compression elements 204,206 and the heating element 270 cooperate to produce sufficient compression and heat in the compressed overlapping plies 105,107 in the sealing zone 276 to heat seal the overlapping plies 105,107 together, thereby sealing closed the inflated inflatable chambers 120 and trapping the fluid. Other suitable sealers such as ultrasonic welders or adhesive sealers can be used.

Figure 7:
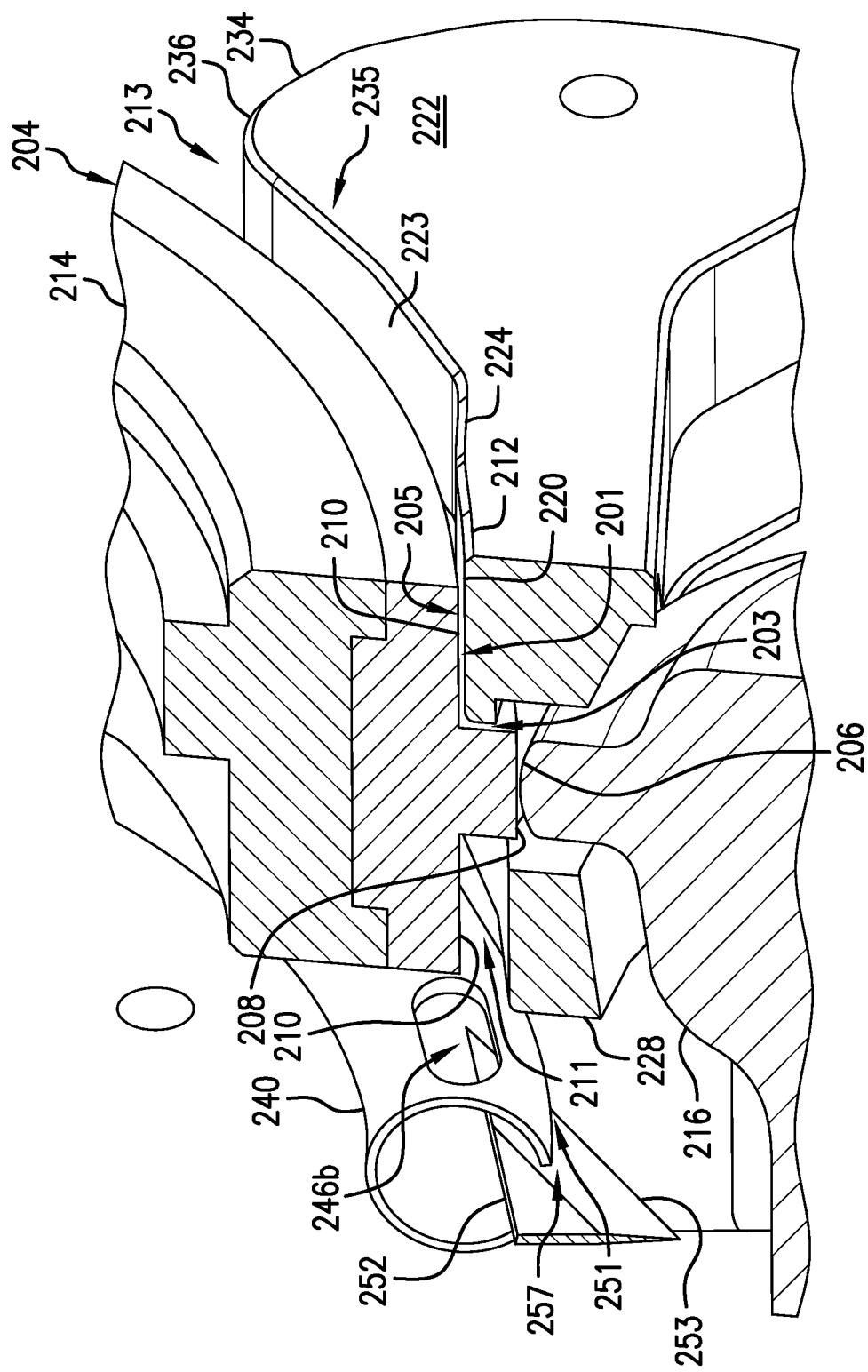
FIG. 7 is a partial isometric section view of the heat sealer of the device of FIG. 2.
Figure 8:
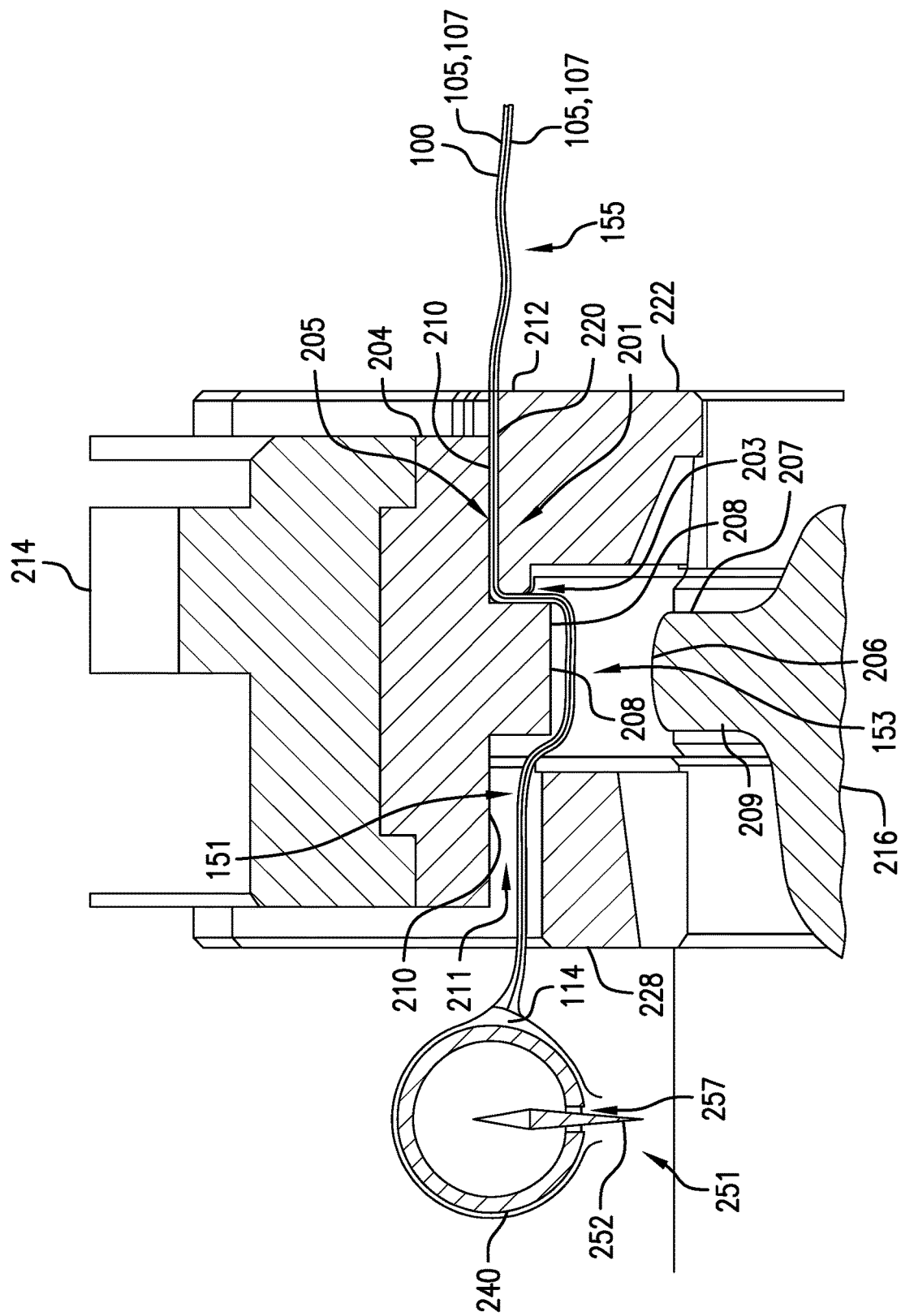
FIG. 8 is a section view of the heat sealer of the device of FIG. 2 in an unengaged configuration.
Figure 9:
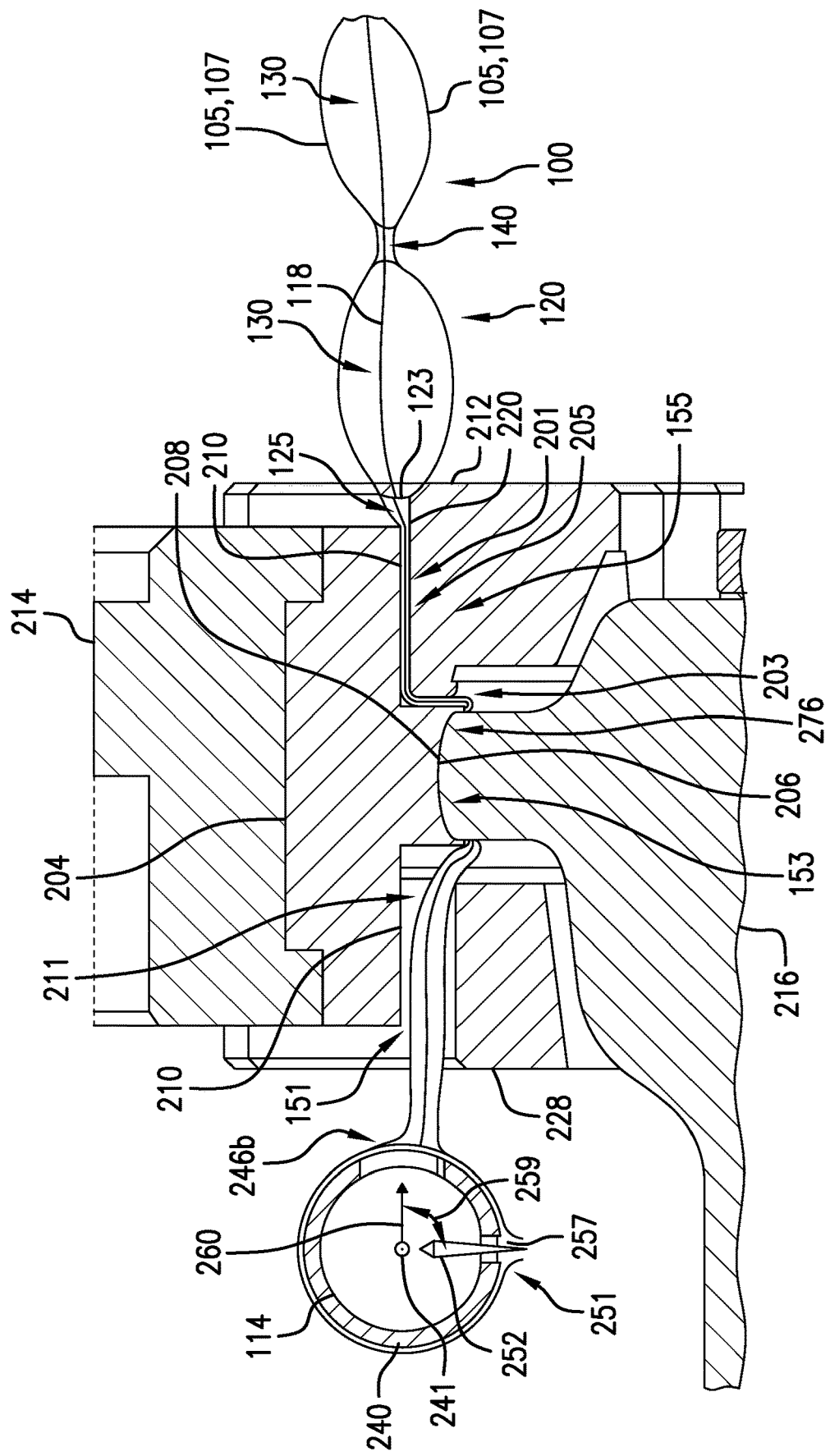
FIG. 9 is a section view of the heat sealer of the device of FIG. 2 in an engaged configuration.

In the embodiment shown, the compression element 206 is provided as a rotary sealing element 216. The rotary sealing element 216 is positioned such that the compression element 206 contacts one side of the web material 100 (e.g., one of the plies 105, 107) and is opposed to the compression element 204 which contacts an opposite side (e.g. the other of the plies 105, 107) of the web material 100 in the sealing zone 276 to form the longitudinal seal 170 to trap inflation gas in the inflatable chambers 120. FIGS. 7-9 are cross-sectional views showing the rotary sealing element 216 which has a relatively narrow convex portion forming the compression element 206 around its circumference. In FIG. 7, for convenience, the rotary sealing element 216 is shown partially retracted from the compression element 204 with respect to a sealing position, as is shown for example in FIG. 9. Certain components of the inflation and sealing device 101 are visible behind the web material 100. Transverse walls 207, 209 extend inwardly from the convex portion toward the rotation axis of the sealing element 216. The right-hand portion of the web material 100 as shown in FIGS. 8-9 is the inflation channel 114 into which the inflation nozzle 240 is inserted. In this embodiment, the inflation nozzle 240 functions as an air injector by discharging air (or other inflation fluid) through one or more outlets 246a,b located along the nozzle 240. In other embodiments, an injector separate from the nozzle 240 can be used to inject inflation gas into the inflatable chambers 120. In some embodiments, the sealing element 216 includes a non-stick release coating to prevent sticking of the web material 100 thereon and reduce friction.

As shown, the heating element 270 is a plug or cartridge-style heater that is electrically powered. The heating element 270 can be electrically heated for instance by providing an electrical resistance that converts electrical energy into heat energy. The heating element 270 can be powered by direct current or alternating current, which alternating current can be one phase or three phase power. The heat generated in the heating element conducts, and can convect, heat from the heating element 270 to the rotary sealing element 216 and to the compression element 206.

The heating element 270 can be any material or design suitable to seal together adjacent plies 105,107 together. In various embodiments the heating element 270 can be resistive wire or foil. The wire or foil can be formed of nichrome, iron-chromium-aluminium, cupronickel or other metals suitable for forming and operating a heating element under conditions that are used for sealing plies of the flexible material together allowing the heating element 270 to melt, fuse, join, bind, or unite together the two plies 105,107. In some embodiments, the heating element 270 is formed from about 80% nickel and 20% chromium annealed soft. In other embodiments, the heating element 270 can be a thin-film heater element. The thin-film heating element 270 can be formed of barium titanate and lead titanate composites or other materials suitable for forming and operating the heating element under conditions that allow the heating element 270 to obtain a sufficient heat to seal the plies together.

In the embodiment shown, the sealing element 216 is mounted such that its axis is fixed relative to the support structure 141. In other embodiments it can be mounted such that it is displaceable toward and away from the compression element 204, either manually or by mechanical assistance.

Figure 5:
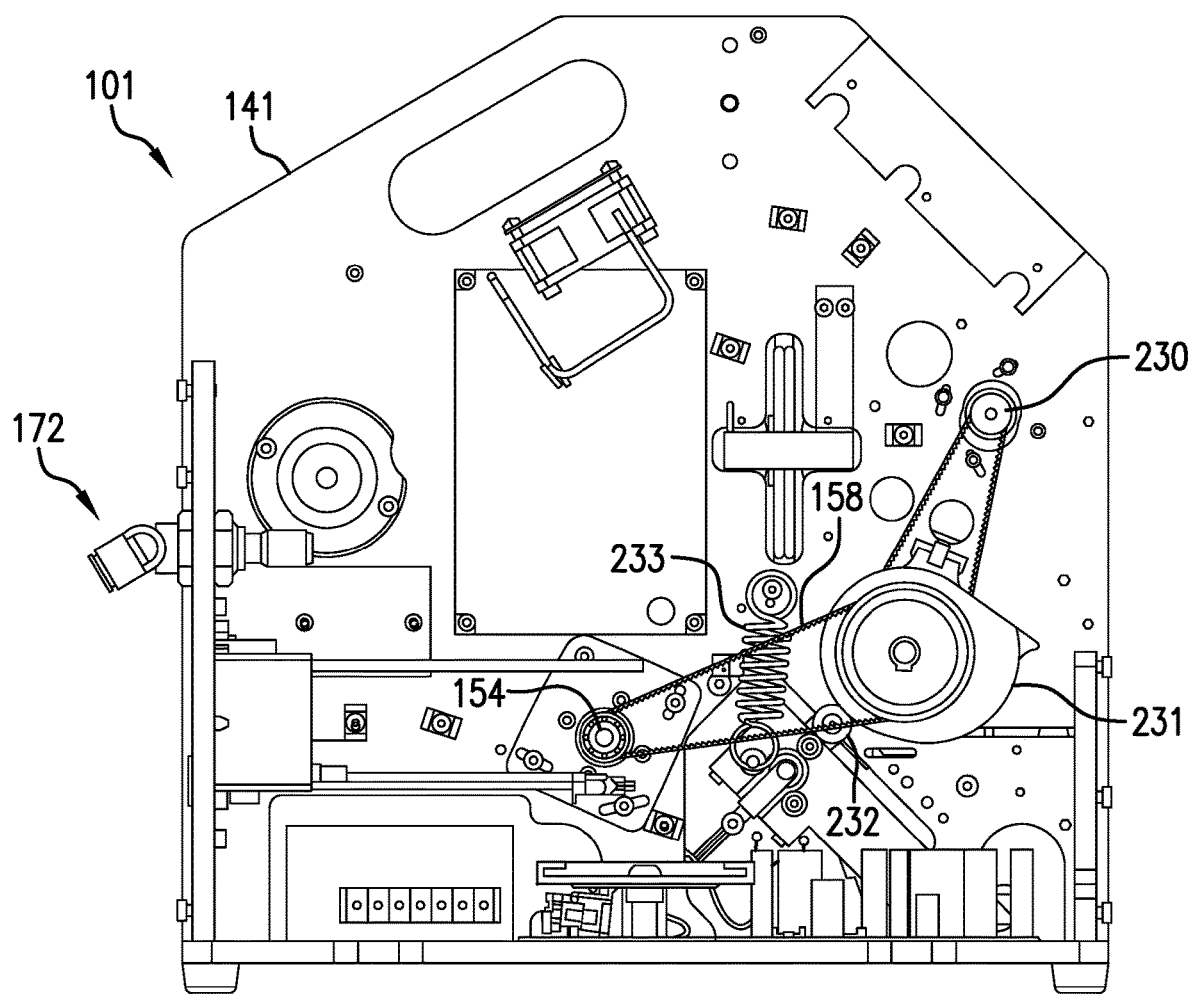
FIG. 5 is a rear elevation view of the device of FIG. 2 with covers removed.

It may be desirable to retract the sealing element 216 away from the web material 100, e.g., when operation of the inflation and sealing device 101 is interrupted so as to prevent burning of the web material 100. As shown in FIG. 5, the position of the sealing element 216 can be adjusted for increasing or decreasing the pressure between the compression element 206 and the compression element 204. For example, an actuator 230 actuates a cam 231 via a belt 156. A cam follower 232 rides on the cam 231 to cause the sealing element 216 to be displaced such that a spring 233 is compressed or decompressed to create more or less seal force, between the compression elements 204,206 respectively. Sealing pressure can be adjusted, for example, to accommodate web materials 100 of different thickness, different materials, or different numbers of plies.

In the embodiment illustrated the sealing element 216 is freewheeling, e.g., is caused to rotate by the movement of the web material 100 against which the sealing element 216 is pressed. In other embodiments, as an alternative to a freewheeling sealing element 216, a motor can be provided for rotating the sealing element 216 in coordination with the other driving mechanisms.

Figure 10:
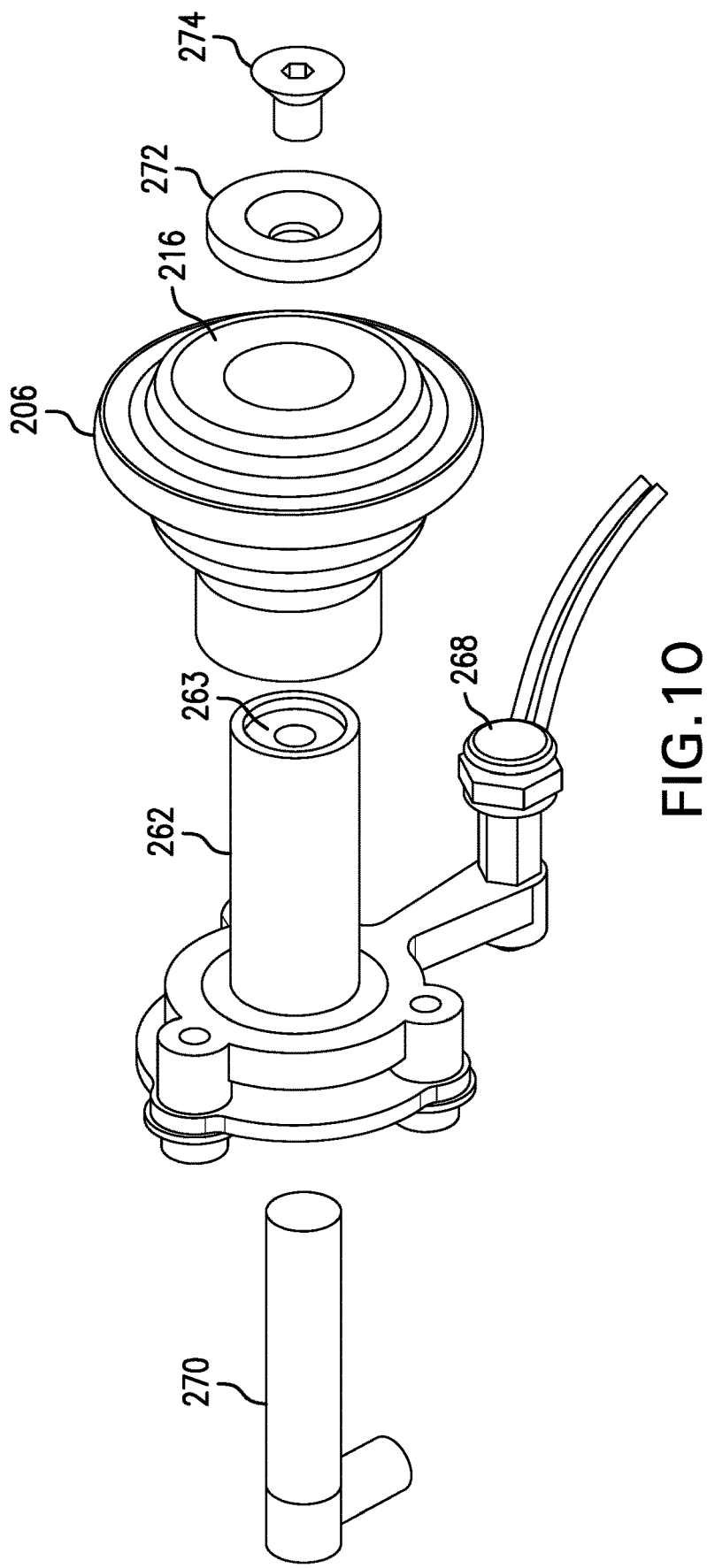
FIG. 10 is a partial exploded view of a rotary sealing element of the device of FIG. 2.

FIG. 10 shows an exploded view of the sealing element in the inflation and sealing device 101. A high temperature resistant bearing or bushing 262 fits into the sealing element 216. The sealing element 216 is retained by a retainer 272, such as a washer, held in place by a fastener 274, such as a screw, rivet, bolt, or the like. In some embodiments the sealing element 216 can be made from a metal such as aluminum, steel, brass, bronze; or other suitable material. Thus, the sealing element 216 can have an appreciable thermal mass. For instance, the sealing element 216 can have a sufficient thermal mass maintain a sufficiently consistent temperature to continually seal the plies 105,107 as they travel through the sealing zone 276. The bushing 262 is positioned over a shaft 263 that includes an opening suitable to receive the heating element 270. A temperature sensor 268, such as a thermistor or thermocouple, is supplied to sense and allow control of the temperature of the heat sealer 202. The temperature of the heat sealer 202 can be controlled to about 100-450° C., or preferably to 260-310° C., or more preferably to 280-290° C. In accordance with various embodiments, the heat sealer 202 heats up to between about 150° to 250° C. In some embodiments, the heat sealer 202 reaches about 200° C. The peripheral portions of the heat sealer 202 can reach a lower temperature of between about 50 to 100° C.

Figure 4:
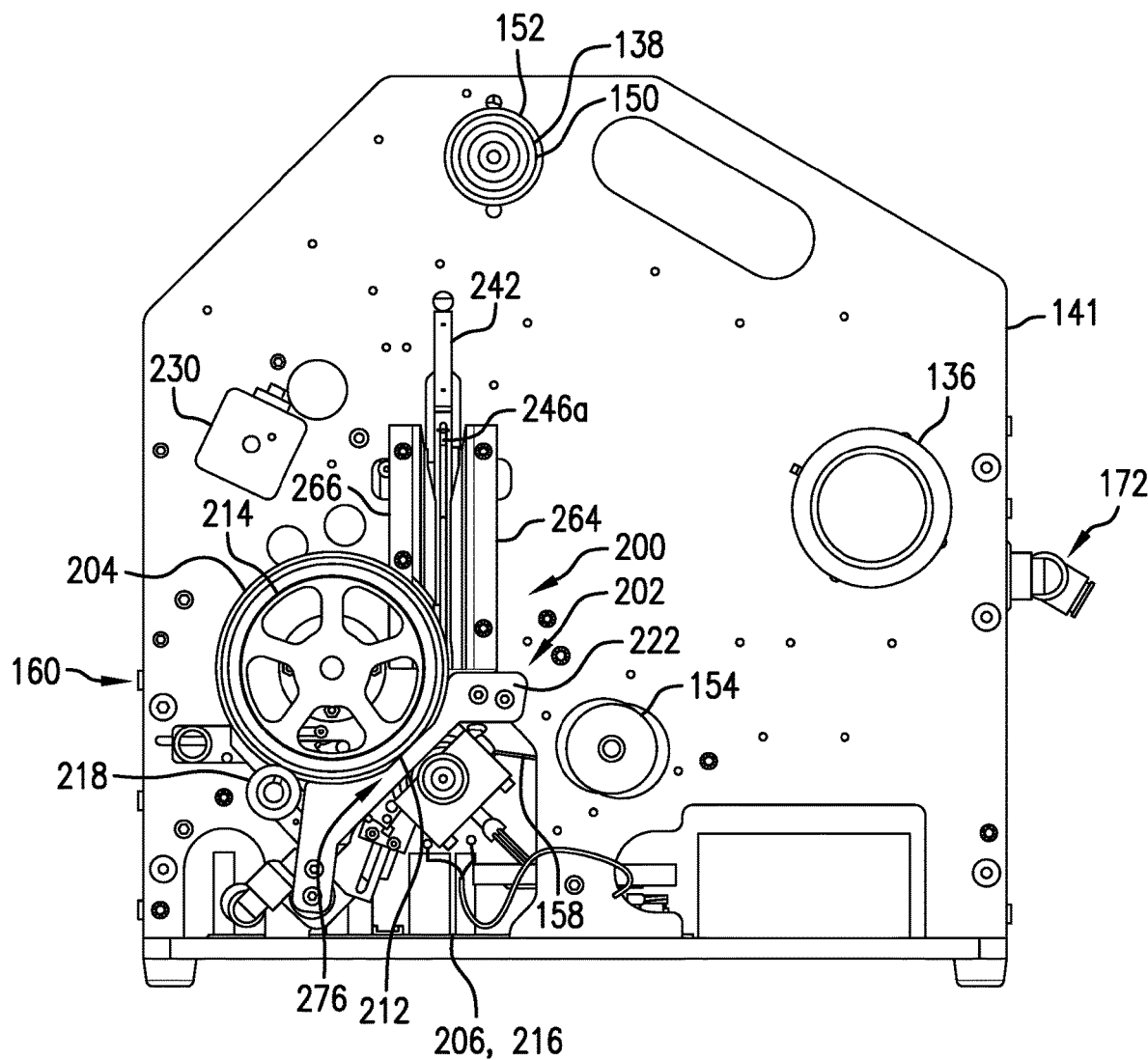
FIG. 4 is a front elevation view of the device of FIG. 2 with covers removed.

As shown in FIGS. 7-9, the compression element 204 is disposed on a backing wheel 214. The compression element 204 is a resilient member extending around the circumference of the backing wheel 214. The backing wheel 214 is driven by the motor 154 as depicted in FIGS. 4 and 5. In other embodiments, the backing wheel can be freewheeling and driven by a drive wheel that frictionally engages the compression element 204. The compression element 204 includes a crown portion 208 to assist in maintaining the web material 100 in a flattened state in the sealing zone 276 as it is fed through the inflation and sealing assembly 200. The crown portion 208 has a raised rectangular profile that extends circumferentially from a shoulder portion 210 of the compression element 204. In other embodiments, the crown portion can have other profiles, such as convex or concave profiles. The crown portion 208 has a larger radius than that of the shoulder portion 210. In the embodiment shown, the compression element 204 includes two shoulder portions 210, with the crown portion 208 disposed transversely between them. In other embodiments, the compression element 204 can have one shoulder portion 210, or can have a flat cross section such that it has no shoulder portions 210 or crown portion 208.

The compression element 204 typically is constructed of a resilient material, e.g., natural rubber or a synthetic rubber such as silicone rubber. The resilient surface conforms in part to the compression element 206, which improves seal quality and increases seal dwell time. As shown in FIG. 9, when the compression elements 204 and 206 are engaged and pressing against one another, the compression element 206 presses into the crown portion 208, distorting it into a concave profile that matches the convex profile of the compression element 206. Non-limiting examples of compression element 206 include drums, plates, wheels, boxes, and other surfaces constructed from metal or other rigid material. The backing wheel 214 can have a resilient material applied to one or more of its surfaces to function as a compression element 204. For example, a compression element 204 can be formed by vulcanizing a layer of rubber (e.g., ¼ inch thick) onto an aluminum or steel wheel or other backing element. Alternatively, a compression element 204 can be preconfigured as a resilient band and stretched over a backing element. The thickness of the compression element 204 usually ranges from about ⅛ to about ¼ inch. The resilient material should be selected such that the web material 100 does not unduly stick to the compression element 204. Also, the resilient material should be selected such that it does not degrade under heat. Suitable resilient materials often have a Shore A hardness of from about 20 to about 95 durometer, usually from about 45 to about 75, and more usually from about 50 to about 70. For example, a silicone rubber of 60 durometer may be used.

In other embodiments, the compression element 204 can be a stationary element that does not rotate. The surface of such a compression element 204 can curve along the material path 115. The apex of the curve can be located at approximately the center of a backing element 214, e.g., where the sealing element 216 contacts the web material 100. The curved surface of the backing element 214 effectively lengthens the path of the web material 100, which helps to compensate for dimensional changes in the web material 100 as it is processed. In particular, the length of the web material 100 is decreased somewhat as the inflatable chambers 120 are inflated (due to expansion of the web material 100 in the thickness direction). However, the edge portion of the web material 100 that is sealed by the heat sealer 202 is not inflated, and thus the length of the edge portion is not decreased as the inflatable chambers 120 are inflated. As a result, the edge portion of the web material 100 is prone to gathering as the inflatable chambers 120 are inflated, e.g., in an "accordion" fashion. The curved surface of the backing element 214 increases the length of the material path 115, which assists in maintaining the web material 100 in a flattened state as it is fed through the inflation and sealing assembly 200.

As illustrated in FIGS. 6-9, a sealer guide member 222 is provided adjacent the backing wheel 214. The sealer guide member 222 has an guide body 234. The guide body 234 has an intake portion 235 and an exit portion 237. The intake portion 235 has an intake guide face 223 spaced from a portion of the compression member 204 to define an intake gap 213. The exit portion 237 has an exit guide face 225 spaced from a portion of the compression member 204 to define an exit gap 215. In this embodiment, the intake guide face 223 defines an intake gap 213 between the shoulder portion 210 of the compression element 204 and the sealer guide member 222 upstream of the sealing zone 276. In this embodiment, the exit guide face 225 defines an exit gap 215 between the shoulder portion 210 of the compression element 204 and the sealer guide member 222 downstream of the sealing zone 276. The exit guide face 225 and the exit gap 215 can be provided similarly to the intake guide face 223 and intake gap 213. An intake shoulder portion 236 provides a smooth transition from the intake guide face 223 to other portions of the guide body 234. An outlet shoulder portion 238 provides a smooth transition from the exit guide face 225 to other portions of the guide body 234. The sealer guide member 222 receives the web material 100 as it leaves the web material director 261 and holds it against the compression member 204. The sealer guide member 222 and the compression member 204 cooperatively force a curve in the material path 115 to enable the backing wheel 214 to drive the web material 100 along the material path 115.

Figure 6:
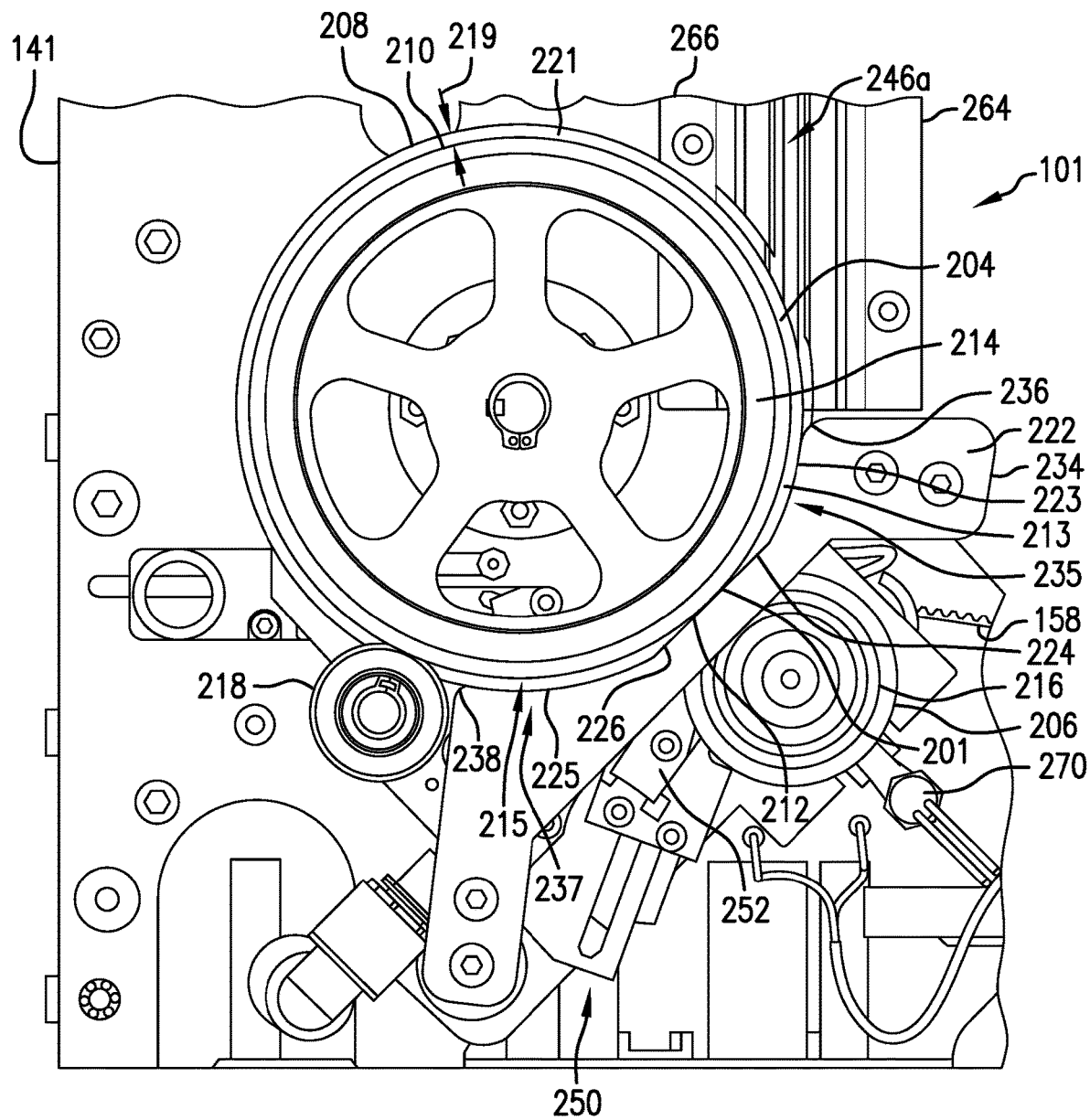
FIG. 6 is a partial detail view of FIG. 4 illustrating an embodiment of a heat sealer of the device of FIG. 2.

As shown in FIG. 6, as the web material 100 passes from the web material director 261, and enters the intake gap 213, the web 100 begins to bend transversely over the crown portion 208 of the compression element 204, creating tension in the web material 100 to align it for sealing. The intake guide face 223 holds the web material 100 against the compression element 204 to provide control of and traction to the web material 100. In this embodiment, the intake guide face begins bending the web material 100 around the compression element 204 upstream of the sealing zone 276. In this embodiment, the intake gap 213 and the exit gap 215 are smaller than the height 219 of a radial wall 221 of the crown portion 208 defined between the shoulder portion 210 and the crown portion 208 of the compression element 204. In this embodiment, the intake gap 213 size is selected to push the web material 100 against the crown portion 208 and/or the shoulder portions 210. In other words, the intake guide face 223 is at a height lower than the crown portion 208 and the crown portion 208 and the intake guide face 223 preferably cooperate to push the inlet channels 125 against the crown portion 208 to cause a transverse bend the web material 100 around the crown portion 208. Preferably the height of the intake guide face 223 over the shoulder portion 210 is at most the height of crown portion 208 plus the height of the inflated inlet channels 125. Lower intake guide face 223 heights relative to the crown portion 208 can cause sharper transverse bends in the web material 100. The bending increases the friction and creates tightness in the area of the web material leading into the sealing zone 276. In some embodiments, the intake guide face 223 is at a height relative to the compression element 204 that does not cause a transverse bend in the web material 100.

In other embodiments the intake gap 213 and/or exit gap 215 can be the same as the height 219. In other embodiments, the intake gap 213 can be greater than the height 219. In this embodiment, the intake gap 213 is wider than a height of the inflated inlet channels 125, such that the inflatable chamber 120 can still receive pressure from the outlets 246a,b. In other embodiments, the intake and exit gaps 213,215 can be the same size as the height of inflated inlet channels 125. In other embodiments, the intake gap 213 can be smaller than the height of the inlet channels 125, such that the gap constrains the height of the inlet channels 125 and further presses the inflated web material against the compression element 204. In embodiments where the height of the inlet channel 125 is smaller than the intake gap 213, the inlet channels 125 may still receive pressure from the outlets 246a,b.

The transitions from the intake gap 213 and exit gap 215 to the web control surface 220 are provided by an entry ramp 224 and an exit ramp 226, respectively. The entry ramp 224 is disposed upstream of the point of contact between the compression elements 204, 206 to align and constrain the web material 100. The entry ramp narrows the intake gap 213 to less than the height of the crown portion 208 above the shoulder portions 210. In this embodiment, portions of the gap between the entry and exit ramps 224, 226 and the shoulder portion 210 of the compression element 204 are smaller than the height of the inflated inlet channels 125, yet do not completely pinch off the inlet channels 125, so that they can still receive pressure from the outlets 246a,b. In other embodiments, the entry and exit ramps 224, 226 can narrow the intake and exit gaps 213, 215 to distances that are larger than the height of the inflated inlet channels 125.

In this embodiment, the guide body 234 includes a web control guide 212 located longitudinally between the intake portion 235 and the exit portion 237. The web control guide 212 extends from the sealer guide member 222 in the thickness direction 113. The sealer guide member 222 receives the web 100 and establishes the material path 115 in the sealing zone 276. In this embodiment, the sealer guide member 222 is configured as a static ski. In other embodiments, the sealer guide member 222 and or web control guide 212 can be provided as rotating or moving elements such as wheels or belts. In other embodiments, a web control guide 212 can be located in the intake portion 235, the exit portion 237, or both, as well as therebetween. In other embodiments, a web control guide 212 can be included in a sealer guide member 228 located opposite the sealing zone 276 from the sealer guide member 222, and can be provided in a similar fashion to a web control guide 212 included in the sealer guide member 222.

The web control guide 212 has a web control surface 220 spaced from the compression member 204 to define a web control gap 201. The web control guide 212 is positioned along the material path 115 such that the web control gap 201 constrains the material path 115 in the sealing zone 276, and bends the web material 100 in a transverse direction along the path 115. In this embodiment, the web control gap 201 is wider than the overlapping plies 105,107 of the web 100 and therefore leaves the inlet channels 125 slightly open to the sealing zone 276. In other embodiments, the web control gap can be small enough to close and fully collapse the inlet channels 125 off from the sealing zone 276.

In this embodiment, the web control gap 201 has a transverse gap portion 205 that extends between the shoulder portion 210 of the compression element 204 and the web control guide 212. The web control gap 201 has a radial gap portion 203 between the sealer guide member 222 a radial wall 221 of the crown portion 208 of the compression element 204. Thus, the web control gap in this embodiment causes a transverse bend in the web material 100. In other embodiments, the web control gap 201 can be straight with respect to any the transverse, longitudinal, or thickness directions of the material 100. In some embodiments, the web control gap 201 can be curved about one or more axes, or can have tapered or undulating profiles. The transverse gap portion 205 and the radial gap portion 203 are named relative to the structure of the sealing assembly 200, for clarity. Both the transverse gap portion 205 and the radial gap portion 203 constrain the thickness of the material path 115 in the transverse direction of the web material 100. The web control gap 201 is smaller than an inflated height of the inlet channels 125.

The web control gap 201 including the transverse gap portion 205 and radial gap portion 203 align and constrain the web material 100 prevent transverse movement of the flexible material 100 towards the compression element 206 to avoid excessive heating of the web 100 outside the sealing zone 276. The web control gap 201, transverse gap portion 205, and radial gap portion 203 can cause tension in the web material 100, straighten and flatten it, and be sufficiently small to prevent such transverse movements of the web material 100. For example, pressurized fluid within the inflatable chambers 120 can tend to push the plies 105,107 of the web material 100 toward the heat sealer 202, causing material to bunch up near the heat sealer and burn. Additionally, the compression elements 204 and 206 can stretch the web material 100 pulling it into the heat sealer 202. The radial gap portion 203 and the first transverse gap portion 205 are also sufficiently small to limit access of fluid within the inflatable chambers 120 to the sealing zone 276. For example, as the web 100 moves through the director portions 264,266 the inflatable chambers 120 are inflated with a pressurized fluid from the nozzle 240 via the outlets 246*a,b*.

FIG. 9 shows an inflated web 100 engaged in the sealing zone 276. The inlet channels 125 are constrained in the radial and transverse gap portions 203 and 205. The chamber portions 130 are shown in fluid communication with one another via the intra-chamber passages 140. The transverse seal 118 is shown defining longitudinal edges of the inflatable chamber 120. The radial gap portion 203 and the transverse gap portion 205 constrain the thickness of the material path 115 in the thickness direction 113. In this embodiment, the transverse gap portion 205 constrains a first thickness of the material path 115 in the thickness direction 113, and aligns the thickness direction of the web material 100 with respective axes of the compression elements 204 and 206. For example, in this embodiment, the transverse gap portion 205 aligns the web material 100 with an axis parallel to the rotational axis of the backing wheel 214. Likewise, the transverse gap portion 205 aligns the web material 100 with an axis parallel to the rotational axis of the rotary sealing element 216. In this embodiment, the radial gap portion 203 constrains the thickness direction of the material path 115 and aligns the web material 100 with axes perpendicular to rotational axes of the backing wheel 214 and/or the rotary sealing element 216. The radial gap portion 203 can also align the web material 100 to be parallel to the transverse walls 207, 209 of the rotary sealing element 216.

In some embodiments, that pressurized fluid tends to escape from the inflatable chambers 120 toward lower pressure, backpressuring at the compression elements 204, 206 as the plies 105,107 are being sealed together. Such backpressure can cause poor seal quality, seal porosity, weak or incomplete sealing, and increased power consumption in the heating element 270 as it is cooled unnecessarily by the blowback. The radial and transverse gap portions 203,205 restrict expansion of the inlet channels 125 after inflation to prevent or reduce backpressure during the sealing process.

As shown in FIGS. 6-9, in the preferred embodiment, the web control gap 201, the radial gap portion 203, and the transverse gap portion 205 defined by the shoulder portion 210 and the web control surface 220 are between about 5 and 25 mils (thousandths of an inch). In some embodiments, the web control gap is at least 2.5 to 50 mils, typically 5 to 15 mils or 5 to 25 mils. In other embodiments, the radial and transverse gap portions 203, 205 can be less than 1 mil. In other embodiments the radial and transverse gap portions 203, 205 can be as large as 60 mils or 100 mils. In some embodiments, the transverse gap portion 205 and/or the radial gap portion 203 can be selected based on the thickness, number of plies, or type of web material 100 being fed into the inflation and sealing device 101. For example, if each of the plies 105, 107 are 1 mil thick, the web material 100 would be about 2 mils thick. If the transverse gap portion 205 is desired to have a total clearance of 2 mils over the thickness of the web 100, the transverse gap portion 205 could be about 4 mils. Thus, the web control guide 212 does not compress the web 100, but prevents transverse movement of the web 100 into the heat sealer 200. The radial and transverse gap portions 203, 205 can be the same as each other or they can be different. Likewise, in embodiments with more than one web control guide, each web control guide can provide different radial and transverse gap portions 203, 205 as desired.

The first transverse gap portion 205 is generally smaller than the director gap 269 between the opposing faces 265,267 of the director portions 264,266. In the embodiment shown, the web control guide 212 is downstream of the director portions 264, 266. In other embodiments, the web control guide 212 is upstream of the director portions 264, 266.

In other embodiments, the web control guide 212 can be spaced by radial or transverse gaps 203,205 from the compression element 206 rather than the compression element 204. In other embodiments, more than one web control guide can be disposed along the material path 115, for instance at other points where it is desired to align the web material 100 or to prevent blowback.

The web control guide 212, and the sealer guide members 222, 228 can be made of suitable materials, such as aluminum, aluminum coated with hard anodizing, hardened tool steel, or an inset in aluminum or some other material. The web control guide 212 and sealer guide members 222, 228 can be made of carbon-filled nylon or molded plastics such as PEEK. The web control guide 212 and sealer guide members 222, 228 can be coated with a low-friction, high temperature coating such as PTFE to reduce snagging, bunching, or gathering of the web material 100 in the radial and transverse gap portions 203, 205.

In the embodiment shown, a second sealer guide member 228 is disposed transversely to an opposite side of the compression element 206 from the sealer guide member 222. In the embodiment shown, the second sealer guide member 228 does not include a web control guide 212. The second sealer guide member 228 defines an inflation side gap 211 in relation to one of the shoulder portions 210. The portion 151 of the web material 100 (see, FIG. 1) is received in the inflation side gap 211. In other embodiments, a web control guide 212 can be disposed on the sealer guide member 228. In some embodiments, a web control guide 212 can be disposed on one or both of the sealer guide members 222, 228. In some embodiments, a web control guide 212 can be disposed above the web material 100, in addition to, or instead of below the web material 100 as shown.

The sealer guide members 222, 228 are positioned along a portion of the backing element 214 near a sealing element 216. In this embodiment, the sealer guide members 222, 228 are positioned along a portion of the circumference of backing wheel 214 in the vicinity of the rotary sealing element 216, as shown in FIGS. 6-9. In some embodiments, the web control guide has a longitudinal length that is a significant portion of a length of one of the compression elements 204, 206. The sealer guide members 222, 228 have an arcuate shape that in some portions follows the circumference of the wheel 214. As shown in FIGS. 7-9 the sealer guide members 222, 228 together with the crown portion 208 of the compression element 204 present the web material 100 to the sealing element 216 in a smooth, flattened state without wrinkling of the web material 100, to reliably form a longitudinal seal 170 to trap inflation gas within the inflatable chambers 120. In other embodiments the sealer guide members 222, 228 follow the shape of the compression element 204.

Figure 11:
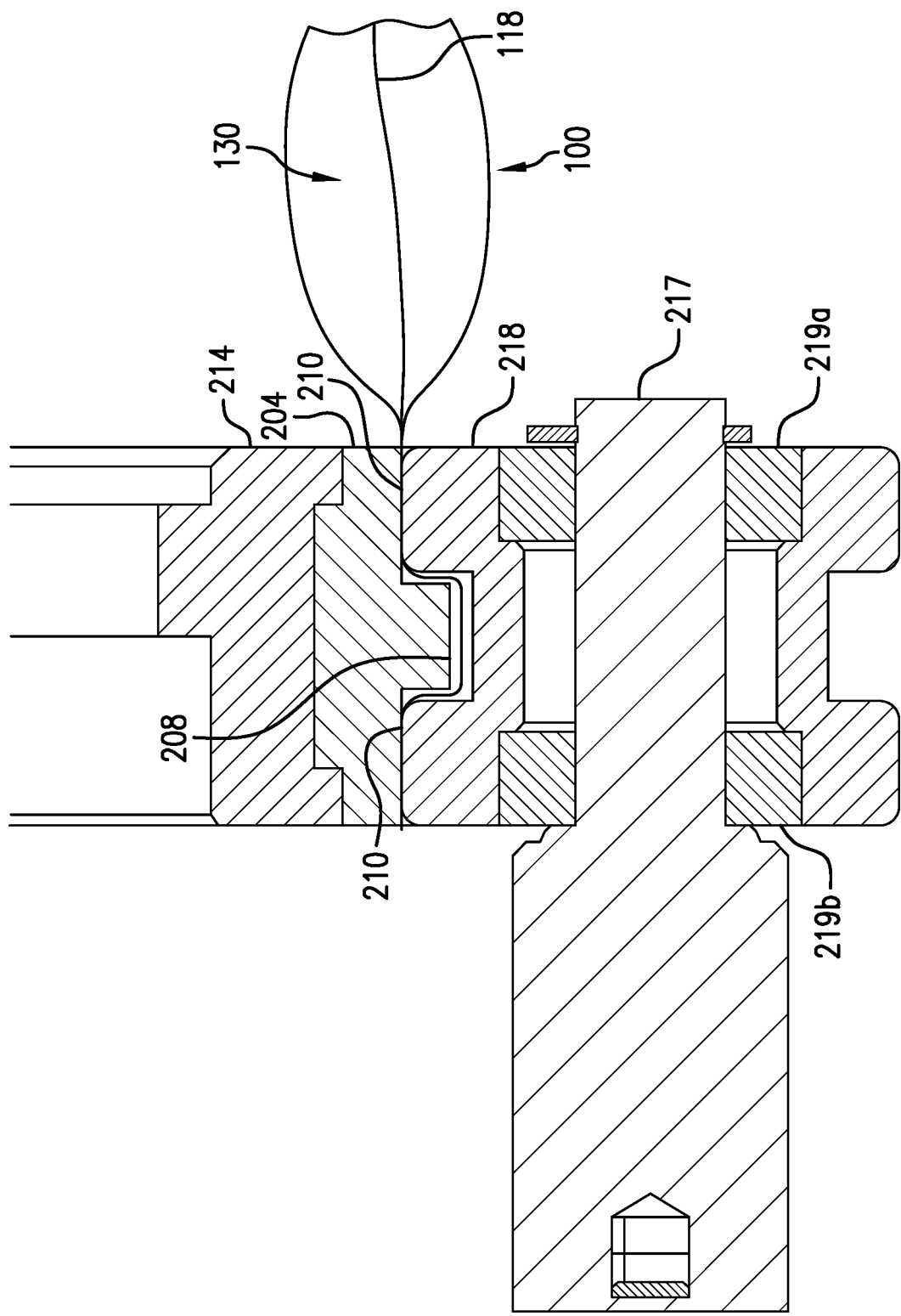
FIG. 11 is a partial section view of a nip roller of the inflation and sealing assembly of the device of FIG. 2.
Figure 12:
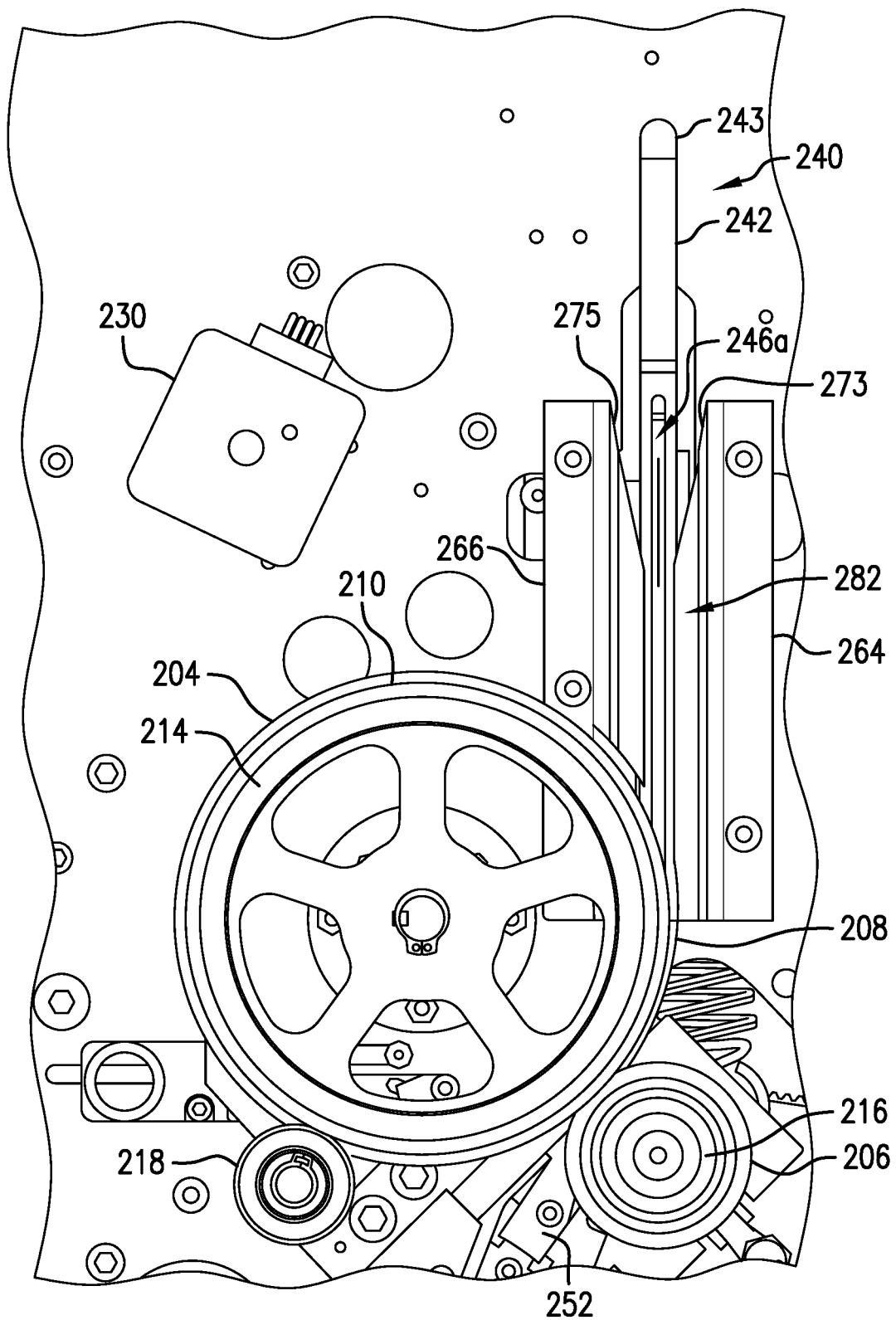
FIG. 12 is a partial front elevation view of an embodiment of an inflation and sealing assembly of the device of FIG. 2.

As illustrated in FIGS. 4, 6, and 11, a downstream seal finisher such as a nip roller 218, defines a portion of the material path 115 downstream of the sealing zone 276. The nip roller 218 is mounted on a shaft 217 extending from the support structure 141. The nip roller 218 engages the shoulder portions 210 of the compression member 204 and stretches the material about the crown portion 208, compressing and stretching the web material 100 in between, after the web 100 has made contact with the heat sealer 202.

When the web material 100 contacts the nip roller 218, the material can still be at least partially melted or soft from the heat sealer 202. The nip roller 218 can thus further consolidate the longitudinal seal 170 and smooth out the web material 100. The nip roller 218 can also cool the web material as it is compressed, to strengthen and finish forming the seal 170. The nip roller 218 can have a profile suitable to cooperate with the compression member 204.

The inflation and sealing device 101 includes a cutting assembly 250 to cut the web material 100. The cutting assembly 250 includes a cutter 252 positioned to cut open the inflation channel 114 from the nozzle 240. The cutter 252 can be include stationary or rotating cutting element. The cutter 252 can be sharp, typically cutting by slicing; abrasive, cutting by abrasion; or another suitable cutting mechanism.

Figure 13:
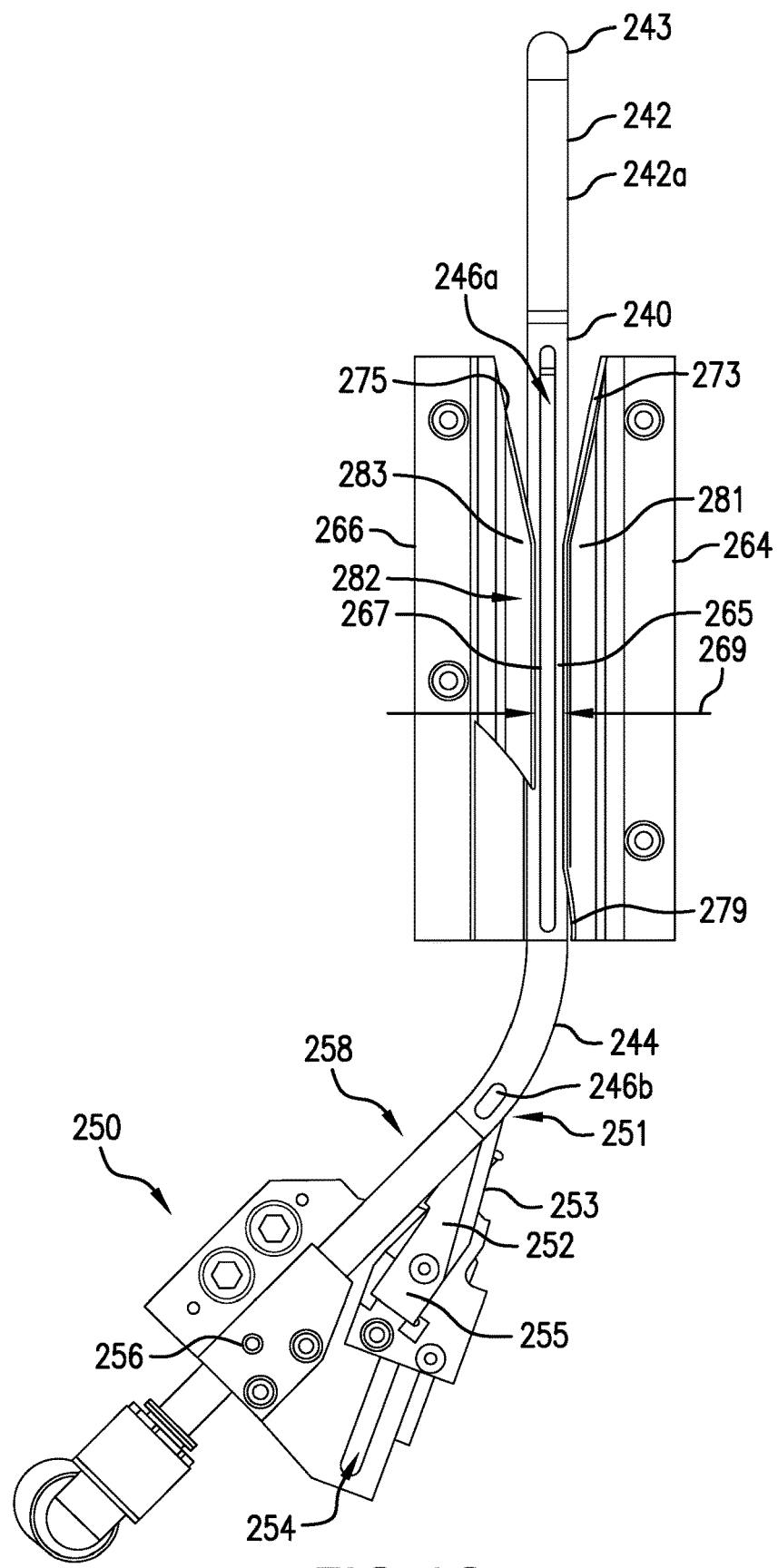
FIG. 13 is a simplified isometric view of a portion of the inflation and sealing assembly of the device of FIG. 2.

As shown in FIG. 13, in this embodiment, the cutter 252 is a blade with a sharp cutting edge 253 that is sufficiently sharp to cut the web material 100 as it is drawn past the cutting edge 253 along the material path 115. The cutting assembly 250 in this embodiment is positioned to cut the web 100 at a transverse location between the first longitudinal edge 110 and the inlet channel 125 of the inflatable chambers 120, but in alternative embodiments, other positions, such as positions about the inflation nozzle, can be employed. The cutter 252 cuts the web material 100 to open the inflation channel 114 of the web material 100 and allow the web to come off the inflation nozzle 240. In various embodiments, the inflation channel 114 of the flexible structure 100 can be central to the web 100 or in other locations, and the configuration of the inflation, sealing, and cutting mechanisms are altered accordingly.

The cutter 252 cuts the web material 100 at a cutting location 251 where the cutting edge 253 is adjacent to an exterior if the nozzle 240. At the cutting location 251, the cutting edge 253 faces upstream and severs the web material 100 as it moves along the path 115 past the cutting location 251 so the inflation channel 114 can come off the nozzle 240. In this embodiment, as shown in FIGS. 7-9 and 13, the cutter 252 protrudes into the interior of the nozzle 240 via a cutter receiving aperture 257 formed in the nozzle 240. As shown, the cutter receiving aperture 257 can be provided as a cutter receiving slot.

As shown in FIG. 9, in this embodiment, the cutting location 251 is at a common station taken transversely through the sealing assembly 200. The sealing zone 276 in this embodiment longitudinally overlaps the longitudinal position of the cutting location 251. In other embodiments, the cutting location 251 is downstream of the sealing zone 276. In other embodiments, the cutting location 251 can be slightly ahead of the sealing zone 276, preferably close to the longitudinal start of the sealing location to minimize pressure loss from the inflatable chambers.

In this embodiment, an pressure maintenance outlet 246b is provided as an opening in the nozzle that longitudinally overlaps the cutting location 251. The pressure maintenance outlet 246b also preferably longitudinally overlaps the sealing zone 276. In other embodiments, the longitudinal position of the pressure maintenance outlet 246b and the cutting location 251 are downstream of the sealing zone 276.

The cutting location 251 is at an angular position about a longitudinal axis 241 of the nozzle and with respect to the material path 115. The pressure maintenance outlet 246b preferably aims transversely with respect to the web 100 and the path 115 to direct flow a flow direction 260 transversely into the inlet channels 125 of the web 100, and in this embodiment transversely to the sealing zone 276. This orients the flow from the pressure maintenance outlet 246b directly at the inlet channels 125 to help maintain the pressure in the inlet channels 125 and directly counter any outflow of fluid escaping from the pressurized inflatable chambers. This angular position can be varied, and in some embodiments, the flow direction 260 of the pressure maintenance outlet 246b can be at an angle of up to 45° from the transverse direction 111 of the web material 100, but other suitable angles are envisioned. The circumferential width of the pressure maintenance outlet 246b in other embodiments can be such that part of the opening of the pressure maintenance outlet 246b is transversely at the inlet channels 125, and part in another direction, such as in the thickness direction of the path or web. In such embodiments, for example, a portion of the flow can be diverted from a transverse direction, but preferably some portion of the flow is in the transverse direction, flowing toward the inlet channels 125.

The cutting location 251 is preferably angularly displaced a cutting location displacement angle 259 from the fluid flow direction 260 out of the pressure maintenance outlet 246b. As shown in FIG. 9, in this embodiment, the cutting location displacement angle 259 is approximately 90°. In various embodiments, the cutting location displacement angle 259 is at least 30°, but preferably is 80°, or approximately 90° or greater. In some embodiments, the cutting location is on an opposite transverse side of the nozzle from the pressure maintenance outlet 246b. The pressure maintenance outlet 246b in the embodiment shown is a different opening from the cutter receiving aperture, and the cutting location displacement angle 259 is sufficient to prevent or minimize fluid from the pressure maintenance aperture from escaping directly out the opening cut into the web by the cutter and to maximize the repressurizing effect of the fluid from the pressure maintenance aperture in the inlet channels.

In some embodiments, the fluid pressure in the inflatable chambers 120 is above atmospheric pressure, typically in the range of 2-3 psig, when finished. Although in some embodiments, the pressure can range from less than one psig and up to 5 or 10 psig, or higher. In other embodiments, the inflatable chambers 120 are filled to separate and inflate the plies, but are not pressurized over atmospheric pressure. Other pressure ranges can be employed for other resulting inflated protective packaging.

As the web material 100 passes the cutting location 251 and the inflation channel 114 is cut, a leak is formed in the web material 100. The overlapping longitudinal location of the cutting location and the pressure maintenance outlet 246b, as well as the orientation of the transverse flow direction 260 to the cutting location 251 (i.e., the cutting location displacement angle 259) has been found to contribute to an increase in pressurization of the inflatable chambers 120, as the flow from the pressure maintenance outlet 246b resists pressure decay in the inflatable chambers 120 as inflation channel 114 is cut. The overlap of the cutting location 251, sealing zone 276, and the pressure maintenance outlet 246b resist pressure decay as the longitudinal seal 170 is formed and the inflatable chambers 120 are sealed. In some embodiments, the increase in pressure within a finished cushion 121 has been found to be significant, on the order of 1 psig during testing when inflating the inflatable chambers to about 3 psig. In some embodiments, the increase in pressure has been found to be about 30% compared to positioning the cutting location 251 that is spaced from a nozzle outlet.

The cutting assembly 250 includes a carriage 254 that allows for alignment and changing of the cutter 252 as desired. The cutting assembly includes a positioning element 256, as well as a magnet 258 (hidden behind the cutter 252 in FIG. 13). The positioning element 256, magnet 258, and carriage 254 provide for precise alignment of the cutter 252. Such precise alignment can allow for the use of hardened cutters 252 (e.g. made from hardened tool steel or tungsten carbide, or the like) that are more durable, but brittle, and thus more sensitive to breakage due to misalignments.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

Having described several embodiments herein, it will be recognized by those skilled in the art that various modifications, alternative constructions, and equivalents may be used. The various examples and embodiments may be employed separately or they may be mixed and matched in combination to form any iteration of the alternatives. Additionally, a number of well-known processes and elements have not been described in order to avoid unnecessarily obscuring the focus of the present disclosure. Accordingly, the above description should not be taken as limiting the scope of the invention. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A protective packaging formation device, comprising:
    a drive configured to, during operation, advance a web of a flexible material along a material path that extends in a longitudinal direction;
    an inflation nozzle configured to, during operation, direct fluid between overlapping plies of the web material in the material path for inflating inflatable chambers defined between the plies with the fluid;
    a heat sealer comprising:
        first and second opposed compression elements in compression against each other and configured to, during operation, compress the overlapping plies together at a sealing zone along the material path, and
        a heating element configured to, during operation, provide heat to the sealing zone, wherein the first and second compression elements and the heating element are arranged and configured to, during operation, cooperatively produce sufficient compression and heat in the compressed overlapping plies in the sealing zone to heat seal the overlapping plies together, thereby sealing closed the inflated inflatable chambers and trapping the fluid therein;
    a sealer guide member that includes a web control guide positioned along the material path at a transverse spacing from the first compression element and configured to, during operation, constrain a first thickness of the material path measured normal to the longitudinal and transverse direction of the material path, wherein the constrained thickness dimension is sufficiently small to prevent transverse movement of the web material towards the first compression element to avoid excessive heating of the web outside the sealing zone; and
    a web material director that is elongated in the longitudinal direction of the material path and is positioned longitudinally with respect to the web control guide, the web material director configured to, during operation, constrain a second thickness of the material path, such that the second thickness is greater than the first thickness.

2. The protective packaging formation device of claim 1, wherein the web material director is located upstream of the web control guide.

3. The protective packaging formation device of claim 1, wherein the web material director is located downstream of the web control guide.

4. The protective packaging formation device, of claim 1, wherein the first compression element is wider in a transverse direction than the second compression element, and the web control guide is disposed opposite the first compression element to constrain the first thickness between the web control guide and the first compression element.

5. The protective packaging formation device of claim 1, wherein a transition between the web control guide and the sealer guide member is provided by a ramp.

6. The protective packaging formation device of claim 1, wherein the first thickness is between 5 and 25 mils.

7. The protective packaging formation device of claim 1, wherein the web control guide is further configured to, during operation, bend the web of flexible material in the transverse direction along the material path.

8. The protective packaging formation device of claim 1, wherein the constrained thickness dimension is sufficiently small to prevent transverse movement of the flexible material towards the first compression element to avoid excessive heating of the web outside the sealing zone.

9. A system comprising:
    the protective packaging formation device of claim 1; and
    a supply of web material loaded into the device, which web material includes overlapping plies with inflatable chambers defined therebetween, which plies define a web thickness, wherein the first thickness is greater than the web thickness.

10. The system of claim 9, wherein the first thickness is selected such that the inflated inflatable chambers spread the plies to contact opposite limits of the constrained first thickness.

11. A protective packaging formation device, comprising:
    a drive configured to, during operation, advance a web of a flexible material along a material path that extends in a longitudinal direction;
    an inflation nozzle configured to, during operation, direct fluid between overlapping plies of the web material in the material path for inflating inflatable chambers defined between the plies with the fluid;
    a heat sealer comprising:
        first and second opposed compression elements in compression against each other and configured to, during operation, compress the overlapping plies together at a sealing zone along the material path, and
        a heating element configured to, during operation, provide heat to the sealing zone, wherein the first and second compression elements and the heating element are arranged and configured to, during operation, cooperatively produce sufficient compression and heat in the compressed overlapping plies in the sealing zone to heat seal the overlapping plies together, thereby sealing closed the inflated inflatable chambers and trapping the fluid therein; and a web control guide positioned along the material path at a transverse spacing from the first compression element and configured to, during operation, constrain a first thickness of the material path measured normal to the longitudinal and transverse direction of the material path, wherein the constrained thickness dimension is sufficiently small to prevent transverse movement of the web material towards the first compression element to avoid excessive heating of the web outside the sealing zone; and wherein the second compression element is a heated mass including a heated convex circumferential portion with heated transverse walls extending therefrom, and the constrained thickness dimension allows the web material to contact the convex circumferential portion, while preventing contact with the heated transverse walls.

12. A protective packaging formation device, comprising:

a drive configured to, during operation, advance a web of a flexible material along a material path that extends in a longitudinal direction;

an inflation nozzle configured to, during operation, direct fluid between overlapping plies of the web material in the material path for inflating inflatable chambers defined between the plies with the fluid;

a heat sealer comprising:
  first and second opposed compression elements in compression against each other and configured to, during operation, compress the overlapping plies together at a sealing zone along the material path, and
  a heating element configured to, during operation, provide heat to the sealing zone, wherein the first and second compression elements and the heating element are arranged and configured to, during operation, cooperatively produce sufficient compression and heat in the compressed overlapping plies in the sealing zone to heat seal the overlapping plies together, thereby sealing closed the inflated inflatable chambers and trapping the fluid therein; and a web control guide positioned along the material path at a transverse spacing from the first compression element and configured to, during operation, constrain a first thickness of the material path measured normal to the longitudinal and transverse direction of the material path, wherein the constrained thickness dimension is sufficiently small to prevent transverse movement of the web material towards the first compression element to avoid excessive heating of the web outside the sealing zone; and wherein the second compression element is a heated wheel, and the web control guide is curved to follow a curve of the heated wheel.

13. The protective packaging formation device of claim 12, wherein the first compression element is operatively coupled to a backing element.

14. The protective packaging formation device of claim 13, wherein the backing element is a backing wheel, and the backing wheel is positioned such that the first compression element contacts the second compression element, pinching the web material therebetween.

15. The protective packaging formation device of claim 14, wherein one of the backing wheel or the heated wheel is driven by a motor to pull the web material through the device.

16. A protective packaging formation device, comprising:

a drive configured to, during operation, advance a web of a flexible material along a material path that extends in a longitudinal direction;

an inflation nozzle configured to, during operation, direct fluid between overlapping plies of the web material in the material path for inflating inflatable chambers defined between the plies with the fluid;

a heat sealer comprising:
  first and second opposed compression elements in compression against each other and configured to, during operation, compress the overlapping plies together at a sealing zone along the material path, and
  a heating element configured to, during operation, provide heat to the sealing zone, wherein the first and second compression elements and the heating element are arranged and configured to, during operation, cooperatively produce sufficient compression and heat in the compressed overlapping plies in the sealing zone to heat seal the overlapping plies together, thereby sealing closed the inflated inflatable chambers and trapping the fluid therein; and a web control guide positioned along the material path at a transverse spacing from the first compression element and configured to, during operation, constrain a first thickness of the material path measured normal to the longitudinal and transverse direction of the material path, wherein the constrained thickness dimension is sufficiently small to prevent transverse movement of the web material towards the first compression element to avoid excessive heating of the web outside the sealing zone; and wherein the web control guide comprises a web control surface spaced from the first compression element to define a web control gap, the web control gap having the constrained thickness dimension.

17. The protective packaging formation device of claim 16, wherein the web control gap has a radial gap portion, and a transverse gap portion.

18. The protective packaging formation device of claim 17, wherein the radial gap portion and the first transverse gap portion are sufficiently small to limit access of fluid within the inflatable chambers to the sealing zone.

19. The protective packaging formation device of claim 17, further comprising a sealer guide member, wherein:
  the web control guide extends from the sealer guide member in the first thickness direction;
  the first compression element has a shoulder portion, and a crown portion comprising a radial wall;
  the transverse gap portion is defined by the web control guide and the shoulder portion of the first compression element; and
  the radial gap portion is defined by the sealer guide member and the radial wall of the crown portion.

20. The protective packaging formation device of claim 17, further comprising a backing wheel, wherein:
  the first compression element is disposed on the backing wheel;
  the transverse gap portion is configured to, during operation, align the web of flexible material with an axis parallel to a rotational axis of the backing wheel, and with an axis parallel to a rotational axis of the second compression rotary sealing element; and
  the radial gap portion is configured to, during operation, align the web of flexible material with axes perpendicular to rotational axes of the backing wheel and/or the second compression element, and to align the web material to be parallel to transverse walls of the second compression element.

21. The protective packaging formation device of claim 17, wherein the radial and transverse gap portions are further configured to, during operation, restrict expansion of inlet channels to the inflatable chambers after inflation of the inflatable chambers to prevent or reduce backpressure during sealing of the inflated inflatable chambers.

22. A method for forming a protective packaging formation device, comprising:
providing a drive;
using the drive, advancing a web of a flexible material along a material path that extends in a longitudinal direction;
providing an inflation nozzle;
using the inflation nozzle, directing fluid between overlapping plies of the web material in the material path for inflating inflatable chambers defined between the plies with the fluid;
providing a heat sealer comprising: first and second opposed compression elements in compression against each other; and a heating element;
using the heat sealer: compressing the overlapping plies together at a sealing zone along the material path; providing heat to the sealing zone; and producing sufficient compression and heat in the compressed overlapping plies in the sealing zone to heat seal the overlapping plies together, thereby sealing closed the inflated inflatable chambers and trapping the fluid therein;
providing a web control guide positioned along the material path at a transverse spacing from the first compression element, the web control guide comprising a web control surface spaced from the first compression element to define a web control gap; and
using the web control surface of the web control guide, constraining a thickness of the material path measured normal to the longitudinal and transverse direction of the material path, wherein the web control gap has the constrained thickness dimension and the constrained thickness dimension is sufficiently small to prevent transverse movement of the web material towards the first compression element to avoid excessive heating of the web outside the sealing zone.

* * * * *